United States Patent
Park et al.

(10) Patent No.: US 10,713,197 B2
(45) Date of Patent: Jul. 14, 2020

(54) MEMORY SYSTEM, MEMORY INTERFACING DEVICE, AND INTERFACING METHOD PERFORMED IN THE MEMORY SYSTEM

(71) Applicant: SAMSUNG ELECTRONICS CO., LTD., Suwon-si, Gyeonggi-do (KR)

(72) Inventors: Jae-Geun Park, Suwon-si (KR); Young-Jin Cho, Seoul (KR)

(73) Assignee: SAMSUNG ELECTRONICS CO., LTD., Suwon-si, Gyeongg-Do (KR)

( * ) Notice: Subject to any disclaimer, the term of this patent is extended or adjusted under 35 U.S.C. 154(b) by 475 days.

(21) Appl. No.: 14/689,400

(22) Filed: Apr. 17, 2015

(65) Prior Publication Data
US 2015/0347331 A1 Dec. 3, 2015

(30) Foreign Application Priority Data

May 28, 2014 (KR) ........................ 10-2014-0064569

(51) Int. Cl.
*G06F 13/28* (2006.01)
*G06F 13/16* (2006.01)

(52) U.S. Cl.
CPC ........ *G06F 13/287* (2013.01); *G06F 13/1689* (2013.01)

(58) Field of Classification Search
None
See application file for complete search history.

(56) References Cited

U.S. PATENT DOCUMENTS

| | | | |
|---|---|---|---|
| 6,684,275 B1 | 1/2004 | Goldstein | |
| 6,718,139 B1 * | 4/2004 | Finan | H04J 14/0227 398/3 |
| 7,084,664 B1 * | 8/2006 | Lee | H03K 19/17732 326/38 |
| 7,966,590 B2 * | 6/2011 | Kanazawa | G06F 17/5045 716/101 |
| 8,261,008 B2 | 9/2012 | Que | |
| 8,400,838 B2 | 3/2013 | Kumazaki et al. | |
| 8,429,319 B2 | 4/2013 | Do | |
| 8,472,482 B2 * | 6/2013 | Cerreta | H04J 3/047 370/230 |

(Continued)

FOREIGN PATENT DOCUMENTS

CN 101354921 1/2009

OTHER PUBLICATIONS

Official Communication dated Apr. 28, 2018 in related CN Application No. 201510275092.9.

*Primary Examiner* — Henry Tsai
*Assistant Examiner* — Aurangzeb Hassan
(74) *Attorney, Agent, or Firm* — F. Chau & Associates, LLC

(57) ABSTRACT

A method of interfacing a memory controller and a memory device in a memory system includes transmitting a control signal between the memory controller and the memory device using a time division multiplexing (TDM) communication process, and transmitting data between the memory controller and the memory device using a serializer/deserializer (SERDES) communication process. Data communication in the memory system is performed via a physical channel and a plurality of virtual channels corresponding to the physical channel.

20 Claims, 32 Drawing Sheets

(56) References Cited

U.S. PATENT DOCUMENTS

| | | | |
|---|---|---|---|
| 8,538,259 B2 * | 9/2013 | Kai | H04J 14/0226 398/48 |
| 8,559,826 B2 * | 10/2013 | Hongo | G09G 5/006 348/723 |
| 8,594,136 B2 * | 11/2013 | Cucchi | H03M 9/00 370/465 |
| 9,025,964 B2 * | 5/2015 | Suehiro | H04L 7/0331 375/354 |
| 9,087,157 B2 * | 7/2015 | Loh | G06F 13/38 |
| 9,500,077 B2 * | 11/2016 | Li | E21D 9/003 |
| 9,500,706 B2 * | 11/2016 | Sanghani | G01R 31/318552 |
| 2006/0062057 A1 * | 3/2006 | Blasi | G11C 8/16 365/193 |
| 2007/0245061 A1 | 10/2007 | Harriman | |
| 2008/0123638 A1 * | 5/2008 | Liao | G06F 13/4295 370/389 |
| 2008/0181203 A1 * | 7/2008 | Jones | H04J 3/1664 370/353 |
| 2009/0027967 A1 | 1/2009 | Lee | |
| 2009/0304385 A1 * | 12/2009 | Khermosh | H04J 14/0282 398/58 |
| 2010/0202224 A1 | 8/2010 | Oh | |
| 2011/0138114 A1 | 6/2011 | Yen | |
| 2011/0219171 A1 | 9/2011 | Kuehne et al. | |
| 2011/0264851 A1 | 10/2011 | Jeon et al. | |
| 2012/0173792 A1 | 7/2012 | Lassa et al. | |
| 2012/0243361 A1 | 9/2012 | Lee | |
| 2012/0311371 A1 | 12/2012 | Shaeffer | |
| 2013/0007350 A1 | 1/2013 | D'Abreu et al. | |
| 2013/0159766 A1 | 6/2013 | D'Abreu et al. | |
| 2013/0262744 A1 | 10/2013 | Ramachandra et al. | |
| 2016/0062937 A1 * | 3/2016 | Huang | G06F 13/362 710/116 |

\* cited by examiner

FIG. 25

| CH_VAL_O | CH0 | CH1 | CH2 | CH3 | CH0 | CH1 | CH2 | CH3 |
|---|---|---|---|---|---|---|---|---|
| DQS_w | | | | | | | | |
| DQ_CH[0] | 01 | 02 | 03 | 04 | 01 | 02 | 03 | 04 |
| DQ_CH[1] | 05 | 06 | 07 | 08 | 05 | 06 | 07 | 08 |
| DQ_CH[2] | 14 | 11 | 12 | 13 | 14 | 11 | 12 | 13 |
| DQ_CH[3] | 18 | 15 | 16 | 17 | 18 | 15 | 16 | 17 |
| DQ_CH[4] | 23 | 24 | 21 | 22 | 23 | 24 | 21 | 22 |
| DQ_CH[5] | 27 | 28 | 25 | 26 | 27 | 28 | 25 | 26 |
| DQ_CH[6] | 32 | 33 | 34 | 31 | 32 | 33 | 34 | 31 |
| DQ_CH[7] | 36 | 37 | 38 | 35 | 36 | 37 | 38 | 35 | ured
MEMORY SYSTEM, MEMORY INTERFACING DEVICE, AND INTERFACING METHOD PERFORMED IN THE MEMORY SYSTEM

CROSS-REFERENCE TO RELATED APPLICATIONS

This application claims priority under 35 U.S.C. § 119 to Korean Patent Application No. 10-2014-0064569, filed on May 28, 2014, the disclosure of which is incorporated by reference herein in its entirety.

TECHNICAL FIELD

Exemplary embodiments of the present inventive concept relate to memory interfacing method and device, and more particularly, to a memory system, a memory interfacing device, and an interfacing method performed in the memory system.

DISCUSSION OF THE RELATED ART

A memory system utilizes an interfacing device for communication between a memory device and a memory controller. A plurality of physical channels may be used to increase the number of memory chips that are controllable by one memory controller. However, when a memory system uses a plurality of physical channels, the number of I/O ports of the memory controller increases, and the transmission rate may decrease.

SUMMARY

Exemplary embodiments of the inventive concept provide an interfacing method performed in a memory system for producing an effect of using a plurality of channels by using input/output (I/O) ports with respect to one physical channel.

Exemplary embodiments of the inventive concept further provide a memory interfacing device for producing an effect of using a plurality of channels by using I/O ports with respect to one physical channel.

Exemplary embodiments of the inventive concept further provide a memory system capable of increasing a data transmission rate.

According to an exemplary embodiment of the inventive concept, a method of interfacing a memory controller and a memory device in a memory system includes transmitting a control signal between the memory controller and the memory device using a time division multiplexing (TDM) communication process, and transmitting data between the memory controller and the memory device using a serializer/deserializer (SERDES) communication process. Data communication in the memory system is performed via a physical channel and a plurality of virtual channels corresponding to the physical channel.

In an exemplary embodiment, the control signal is one of a plurality of control signals including a first signal including channel information and a second signal including chip enable information. The channel information designates the plurality of virtual channels.

In an exemplary embodiment, the control signal is one of a plurality of control signals, the plurality of control signals is transmitted from the memory controller to the memory device via the physical channel, and each of the plurality of control signals corresponds to a virtual channel from among the plurality of virtual channels.

In an exemplary embodiment, the method further includes converting serial data received from the memory controller into parallel data, and outputting the parallel data to data input/output (I/O) ports corresponding to the plurality of virtual channels.

In an exemplary embodiment, the method further includes converting parallel data received from the memory device into serial data, and outputting the parallel data to a data input/output (I/O) port corresponding to the physical channel.

In an exemplary embodiment, the method further includes generating a plurality of control signals including the control signal. Each of the control signals corresponds to a virtual channel from among the plurality of virtual channels.

In an exemplary embodiment, the control signal is one of a plurality of control signals, and the method further includes generating a plurality of chip enable signals based on a first control signal from among the plurality of control signals relating to channel information, a second control signal from among the plurality of control signals relating to chip enable information, and a third control signal from among the plurality of control signals relating to chip enable timing information. The plurality of chip enable signals corresponds to the plurality of virtual channels, and the first to third control signals are communicated from the memory controller via the physical channel.

In an exemplary embodiment, the control signal is one of a plurality of control signals, and the method further includes generating a plurality of command latch enable signals and command information based on a control signal from among the plurality of control signals relating to channel information, and control signals from among the plurality of control signals relating to data input/output (I/O) ports into which the command information is input. The plurality of command latch enable signals corresponds to the plurality of virtual channels, and the plurality of command latch enable signals and the command information are communicated from the memory controller via the physical channel.

In an exemplary embodiment, the control signal is one of a plurality of control signals, and the method further includes generating a plurality of address latch enable signals and address information based on a control signal from among the plurality of control signals relating to channel information, and control signals from among the plurality of control signals relating to data input/output (I/O) ports into which the address information is input. The plurality of address latch enable signals corresponds to the plurality of virtual channels, and the plurality of address latch enable signals and the address information are communicated from the memory controller via the physical channel.

In an exemplary embodiment, the control signal is one of a plurality of control signals, and the method further includes generating a plurality of data strobe signals corresponding to the plurality of virtual channels based on a control signal from among the plurality of control signals relating to channel information, a write data strobe signal, and control signals from among the plurality of control signals relating to data input/output (I/O) ports. The plurality of data strobe signals is communicated from the memory controller via the physical channel.

In an exemplary embodiment, the method further includes receiving data read from the memory device as parallel data via a plurality of data input/output (I/O) ports corresponding to the plurality of virtual channels based on the control signal and a read enable signal. The data and the read enable signal are input from the memory controller via the physical channel, and the control signal relates to channel information. The method further includes converting the parallel data received via the plurality of I/O ports into serial data, and outputting the serial data to a data I/O port of the physical channel.

In an exemplary embodiment, the method further includes setting a communication speed of the physical channel to be at least two times higher than a communication speed of the plurality of virtual channels.

In an exemplary embodiment, the method further includes converting serial data output from each of two or more data input/output (I/O) ports of the physical channel into parallel data in response to a number of the data I/O ports of the physical channel assigned to the plurality of virtual channels being at least two, and outputting the parallel data to the data I/O ports assigned to the plurality of virtual channels.

In an exemplary embodiment, the method further includes splitting parallel data received from data input/output (I/O) ports of the memory device into two or more pieces of parallel data in response to a number of data I/O ports of the physical channel assigned to the plurality of virtual channels being at least two, converting each piece of the split parallel data into serial data, and outputting the serial data to the data I/O ports assigned to the plurality of virtual channels.

According to an exemplary embodiment of the present inventive concept, a memory interfacing device includes a time division multiplexing (TDM) interface configured to transmit and receive a plurality of control signals between a memory controller and a memory device using a TDM communication process, and a serializer/deserializer (SERDES) interface configured to convert first parallel data input from the memory device into first serial data and output the first serial data to the memory controller, or convert second serial data input from the memory controller into second parallel data and output the second parallel data to the memory device, based on the plurality of control signals communicated using the TDM communication process.

In an exemplary embodiment, the TDM interface is configured to output a control signal from among the plurality of control signals to each of a plurality of virtual channels.

In an exemplary embodiment, the SERDES interface is configured to split N data input/output (I/O) ports provided in a single physical channel connected to the memory controller into M data I/O ports, and assign the M data I/O ports to data I/O ports of the virtual channels. N is an integer greater than or equal to 2, M≤N, and M virtual channels are connected to the memory device.

In an exemplary embodiment, the SERDES interface is configured to convert third serial data output from each of two or more data I/O ports of the physical channel into third parallel data, and output the third parallel data to data I/O ports assigned to the plurality of virtual channels in response to a number of the data I/O ports assigned to the plurality of virtual channels being at least two.

In an exemplary embodiment, the SERDES interface is configured to split third parallel data received from data I/O ports of the memory device into two or more pieces of third parallel data, convert each piece of the split third parallel data into third serial data, and output the third serial data to data I/O ports assigned to the plurality of virtual channels.

In an exemplary embodiment, the memory controller and the TDM interface are configured to transmit and receive the plurality of control signals via a first signal port through which channel information relating to physical channels is communicated, a second signal port through which chip enable information is communicated, a third signal port through which chip enable timing information is communicated, a read data strobe signal port, a write data strobe signal port, a command latch enable signal port, an address enable signal port, a write enable signal port, and a read enable signal port.

In an exemplary embodiment, the TDM interface and the memory device are configured to transmit and receive the plurality of control signals via a chip enable signal port, a command latch enable signal port, an address enable signal port, a write enable signal port, a read enable signal port, and a data strobe signal port.

According to an exemplary embodiment of the present inventive concept, a memory system includes a memory controller configured to input and output a plurality of control signals and data, a memory device configured to perform a data read operation and a data write operation based on the control signals, and an interfacing device configured to communicate with the memory controller via a physical channel, and communicate with the memory device via a plurality of virtual channels corresponding to the physical channel. The interfacing device is configured to transmit the plurality of control signals using a time division multiplexing (TDM) communication process and transmit the data using a serializer/deserializer (SERDES) communication process.

In an exemplary embodiment, the interfacing device is configured to perform TDM on the plurality of control signals input via the physical channel connected to the memory controller, and output the plurality of control signals with respect to each of the plurality of virtual channels.

In an exemplary embodiment, the interfacing device is configured to convert first serial data output from the memory controller into first parallel data and transmit the first parallel data to the memory device, and convert second parallel data output from the memory device into second serial data and transmit the second serial data to the memory controller.

In an exemplary embodiment, the memory system further includes a frequency boosting interfacing device connected between the interfacing device and the memory device via the plurality of virtual channels. The frequency boosting interfacing device includes a multiplexer configured to electrically separate input/output (I/O) ports of the memory device in each of the plurality of virtual channels.

According to an exemplary embodiment of the present inventive concept, a method of interfacing a memory controller and a memory device in a memory system includes transmitting and receiving a plurality of control signals between the memory controller and the memory device using a time division multiplexing (TDM) communication process. The method further includes converting first parallel data input from the memory device into first serial data and outputting the first serial data to the memory controller using a serializer/deserializer (SERDES) communication process, or converting second serial data input from the memory controller into second parallel data and outputting the second parallel data to the memory device using the SERDES communication process, based on the plurality of control signals communicated using the TDM communication process.

BRIEF DESCRIPTION OF THE DRAWINGS

The above and other features of the present inventive concept will become more apparent by describing in detail exemplary embodiments thereof with reference to the accompanying drawings, in which:

FIG. 25 is a timing diagram of signals relating to data transmission according to a write operation between a memory controller and an interfacing device in memory systems according to an exemplary embodiment of the inventive concept.

DETAILED DESCRIPTION OF THE EXEMPLARY EMBODIMENTS

Figure 1:
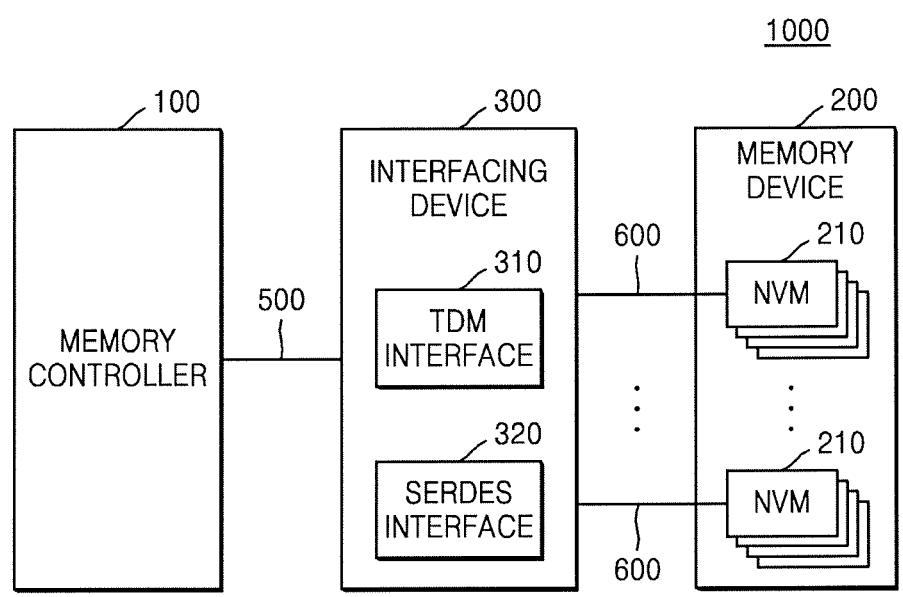
FIG. 1 is a block diagram of a memory system according to an exemplary embodiment of the inventive concept.

Exemplary embodiments of the present inventive concept will be described more fully hereinafter with reference to the accompanying drawings. Like reference numerals may refer to like elements throughout the accompanying drawings. In the accompanying drawings, sizes of structures may be exaggerated for clarity.

It will be understood that when an element or layer is referred to as being "on", "connected to", "coupled to", or "adjacent to" another element or layer, it can be directly on, connected, coupled, or adjacent to the other element or layer, or intervening elements or layers may be present. It will also be understood that when an element or layer is referred to as being "between" two elements or layers, it can be the only element or layer between the two elements or layers, or one or more intervening elements or layers may also be present.

FIG. 1 is a block diagram of a memory system 1000 according to an exemplary embodiment of the inventive concept.

As shown in FIG. 1, the memory system 1000 includes a memory controller 100, a memory device 200, and an interfacing device 300.

The memory controller 100 and the interfacing device 300 are connected to each other via a physical channel 500. A control signal and data may be transmitted between the memory controller 100 and the interfacing device 300 via the physical channel 500. The physical channel 500 may be formed as electrical signal lines that connect input/output (I/O) ports of the memory controller 100 and I/O ports of the interfacing device 300.

The memory device 200 and the interfacing device 300 are connected to each other via a plurality of virtual channels 600. A control signal and data may be transmitted between the memory device 200 and the interfacing device 300 via the virtual channels 600. Herein, data refers to data other than a control signal(s) communicated (e.g., transmitted and received) in the memory system 1000. For example, data may refer to target data being communicated in the memory system 100, including data to be read and stored in the memory device 200, while the control signal(s) refer to signals used to implement data communication in the memory system 100. The virtual channels 600 may be referred to herein as logical channels. The virtual channels 600 may be formed as electrical signal lines that connect I/O ports of the interfacing device 300 and I/O ports of non-volatile memory (NVM) chips 210 included in the memory device 200.

The memory controller 100 controls an erase, write, or read operation in the memory system 1000. The memory controller 100 transmits or receives the control signal and the data for performing the erase, write, or read operation to or from the interfacing device 300 via the physical channel 500.

The memory controller 100 may generate a control signal for performing the erase, write, or read operation in the NVM chips 210 that are respectively connected to the virtual channels. 600. For example, the memory controller 100 generates a control signal with respect to the NVM chips 210 that are respectively connected to the virtual channels 600 using a time division multiplexing (TDM) communication process and transmits the generated control signal to the interfacing device 300 via the physical channel 500.

The memory controller 100 performs data communication between the NVM chips 210 that are respectively connected to the virtual channels 600 using a serializer/deserializer (SERDES) communication process.

The memory device 200 includes the NVM chips 210. For example, the memory device 200 may include a flash memory chip, phase change RAM (PRAM), ferroelectric RAM (FRAM), magnetic RAM (MRAM), etc. For example, the memory device 200 may include flash memory chips that are respectively connected to the virtual channels 600. The memory device 200 may also include flash memory chips included in a plurality of configurations for the virtual channels 600.

The interfacing device 300 includes a TDM interface 310 and a SERDES interface 320. The interfacing device 300 may be implemented, for example, as a single integrated circuit (IC) chip.

The interfacing device 300 transmits the control signal between the memory controller 100 and the memory device 200 using the TDM interface 310 based on a TDM communication process. The interfacing device 300 transmits the data between the memory controller 100 and the memory device 200 using the SERDES interface 320 based on a SERDES communication process.

The TDM interface 310 receives a control signal via the physical channel 500 connected to the memory controller 100 and generates control signals with respect to the respective virtual channels 600 from the input control signal using TDM. The control signals with respect to the respective virtual channels 600 are output to the NVM chips 210 via their corresponding virtual channels 600.

When N number of data I/O ports (where N is an integer greater than or equal to 2) is disposed with respect to the physical channel 500 connected to the memory controller 100, and M number of virtual channels 600 (where M≤N) connected to the memory device 200 is set, the M number of I/O ports disposed in the physical channel 500 may be split into M groups and allocated as I/O ports for the virtual channels 600. For example, when the N number of I/O ports with respect to data path DQ_CH in the physical channel 500 is 8, and the M number of virtual channels is 4, 2 bit I/O ports of data path DQ_CH are allocated for virtual channels 600. For example, when the number of I/O ports of the physical channel 500 that are allocated for the virtual channels 600 is greater than or equal to 2, the SERDES interface 320 may process the following received data.

The SERDES interface 320 may convert serial data input from two or more data I/O ports allocated for the virtual channels 600 into parallel data and transmit the parallel data to the data I/O ports of the memory device 200 connected to the virtual channels 600. The SERDES interface 320 may convert parallel data received from the data I/O ports of the memory device 200 connected to the virtual channels 600 to serial data and transmit the serial data to the I/O ports of the physical channel 500 that are allocated for the virtual channels 600.

In an exemplary embodiment, a communication speed of the physical channel 500 between the memory controller 100 and the interfacing device 300 may be set to be at least two times higher than that of the virtual channels 600 between the interfacing device 300 and the memory device 200. For example, when the number of virtual channels 600 corresponding to the physical channel 500 is K (where K is an integer greater than or equal to 2), the communication speed of the physical channel 500 may be determined to be K times higher than that of the virtual channels 600. For example, when K is 4, if the communication speed of the virtual channels 600 is 200 MHz/400 Mbps, the communication speed of the physical channel 500 may be set to be 800 MHz/1.6 Gbps.

As described above, interfacing is performed between the memory controller 100 and the memory device 200 using both a TDM communication process and a SERDES communication process. As a result, exemplary embodiments of the present inventive concept provide performance comparable to using a plurality of channels while using I/O ports of a single physical channel.

Figure 2:
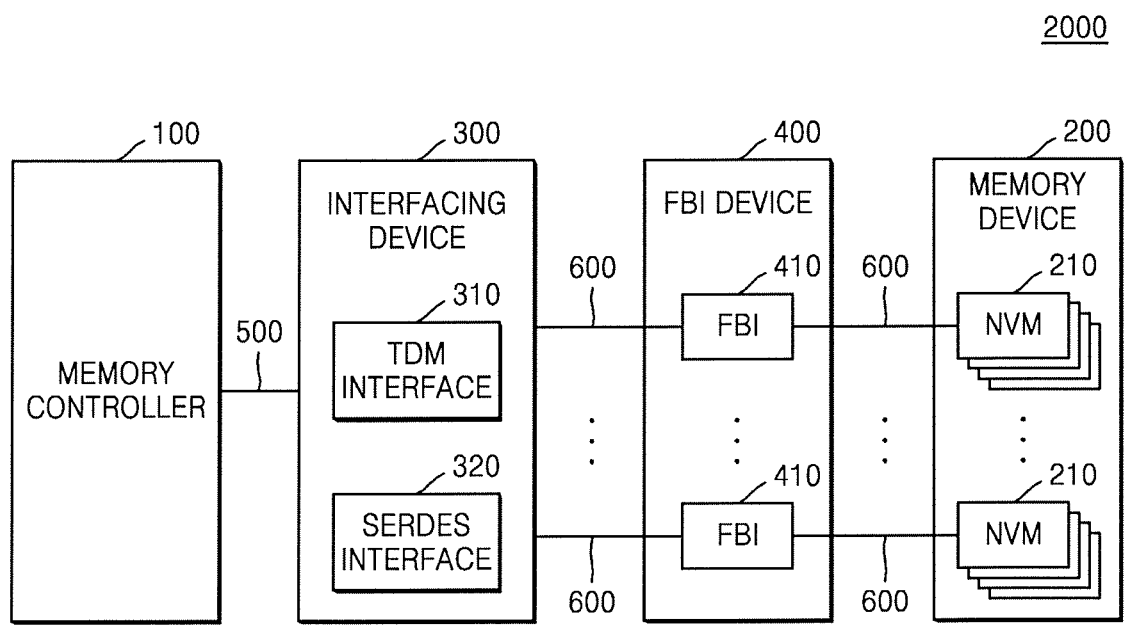
FIG. 2 is a block diagram of a memory system according to an exemplary embodiment of the inventive concept.

FIG. 2 is a block diagram of a memory system 2000 according to an exemplary embodiment of the inventive concept.

As shown in FIG. 2, the memory system 2000 includes the memory controller 100, the memory device 200, the interfacing device 300, and a frequency boosting interface (FBI) device 400.

The memory controller 100, the memory device 200, and the interfacing device 300 shown in FIG. 2 are described above with reference to FIG. 1, and thus, redundant descriptions thereof may be omitted herein.

The memory system 2000 of FIG. 2 further includes the FBI device 400 disposed between the interfacing device 300 and the memory device 200.

The FBI device 400 includes FBIs 410 that are respectively connected to the virtual channels 600. The FBIs 410 reduce a capacitance influence by I/O ports of the NVM chips 210 in the respective virtual channels 600. For reference, if capacitance increases with respect to the I/O ports of the NVM chips 210 that are respectively connected to the virtual channels 600, since signal distortion may occur, an increase in transmission speed of a signal may be limited.

For example, the FBIs 410 may electrically separate the I/O ports of the NVM chips 210 using switching circuit means in the respective virtual channels 600. The FBIs 410 may be implemented using, for example, a multiplexer implemented as the switching circuit means.

Accordingly, the FBI device 400 sets a limit to an increase in the capacitance with respect to the I/O ports of the NVM chips 210 that are respectively connected to the virtual channels 600, which may increase the transmission speed of the signal.

Figure 3:
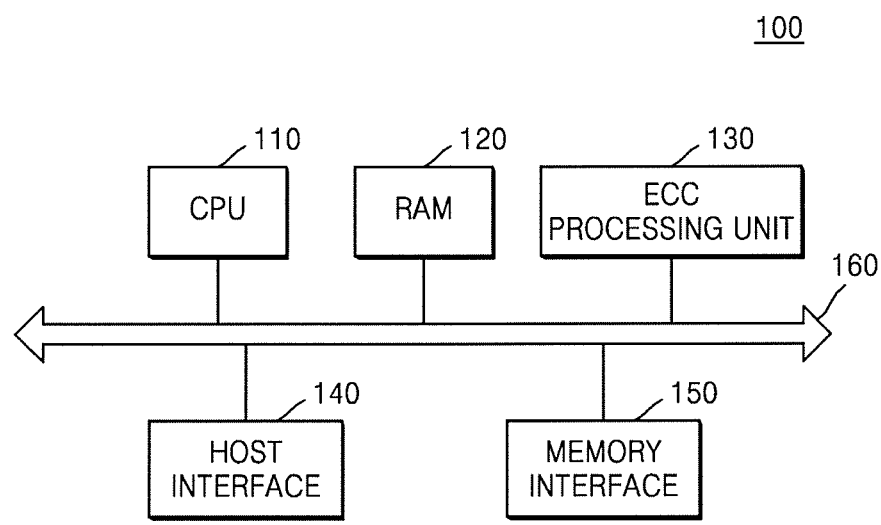
FIG. 3 is a block diagram of a memory controller of FIGS. 1 and 2 according to an exemplary embodiment of the inventive concept.

FIG. 3 is a block diagram of the memory controller 100 of FIGS. 1 and 2 according to an exemplary embodiment of the inventive concept.

As shown in FIG. 3, the memory controller 100 includes a central processing unit (CPU) 110, random access memory (RAM) 120, an error correction code (ECC) processing unit 130, a host interface 140, a memory interface 150, and a bus 160.

Elements of the memory controller 100 may be electrically connected to each other via the bus 160.

The CPU 110 may generally control an operation of the memory system 100 using program code and data stored in the RAM 120. When the memory system 100 is initialized, the CPU 110 may read and load the program code and the data necessary for controlling operations performed in the memory system 100, which are stored in the memory device 200, to the RAM 120.

For example, the CPU 110 generates controls signals for the respective virtual channels 600 in a frame unit based on a TDM communication process and transmits the generated control signals to the interfacing device 300 via the memory interface 150. The CPU 110 may transmit or receive data to or from the interfacing device 300 via the memory interface 150 based on a SERDES communication process.

The RAM 120 stores data received via the host interface 140 or data received from the memory device 200 via the memory interface 150. The RAM 120 may also store data processed by the CPU 110 or the ECC processing unit 130.

The ECC processing unit 130 may generate an error correction code (ECC) with respect to data that is to be transmitted to the memory device 200 using an algorithm such as, for example, a Reed-Solomon (RS) code, a Hamming code, a cyclic redundancy code (CRC), etc. in a write operation. The ECC processing unit 130 performs error detection and correction processing on the data received using the ECC received along with the data received from the memory device 200 in a read operation.

For example, the ECC processing unit 130 may be designed to simultaneously perform parallel ECC processing on data transmitted or received via each of a plurality of virtual channels corresponding to a single physical channel. That is, the ECC processing unit 130 may include ECC processing circuits corresponding to the number of virtual channels corresponding to the physical channel.

Accordingly, the ECC processing unit 130 may simultaneously perform ECC generation processing on the data that is to be transmitted to each of the virtual channels 600 via the physical channel in the write operation. The ECC processing unit 130 may simultaneously perform error detection and correction processing on the data received from each of the virtual channels 600 via the physical channel in the read operation. Thus, a data processing speed may be increased.

The host interface 140 includes a data exchange protocol with a host connected to the memory controller 100 and functions as an interface between the memory controller 100 and the host. Examples of the host interface 140 may include an advanced technology attachment (ATA) interface, a serial advanced technology attachment (SATA) interface, a parallel advanced technology attachment (PATA) interface, a universal serial bus (USB) or serial attached small (SAS) computer system interface, a small computer system interface (SCSI), an eMMC interface, and a unix file system (UFS) interface. However, the host interface 140 is not limited thereto. The host interface 140 performs communication with the host under the control of the CPU 110 for transmission of a command, an address, and data.

The memory interface 150 is electrically connected to the memory device 200 via the interfacing device 300. The memory interface 150 performs communication for transmission of a command, an address, and data transmission with the memory device 200 under the control of the CPU 110. The memory interface 150 may be configured to support communication with a NAND flash memory or a NOR flash memory. The memory interface 150 may be configured to selectively perform software and hardware interleaving operations through a plurality of virtual channels or a single physical channel.

For example, the memory interface 150 may be configured to selectively perform software and hardware interleaving operations through the virtual channels corresponding to the physical channel.

Figure 4:
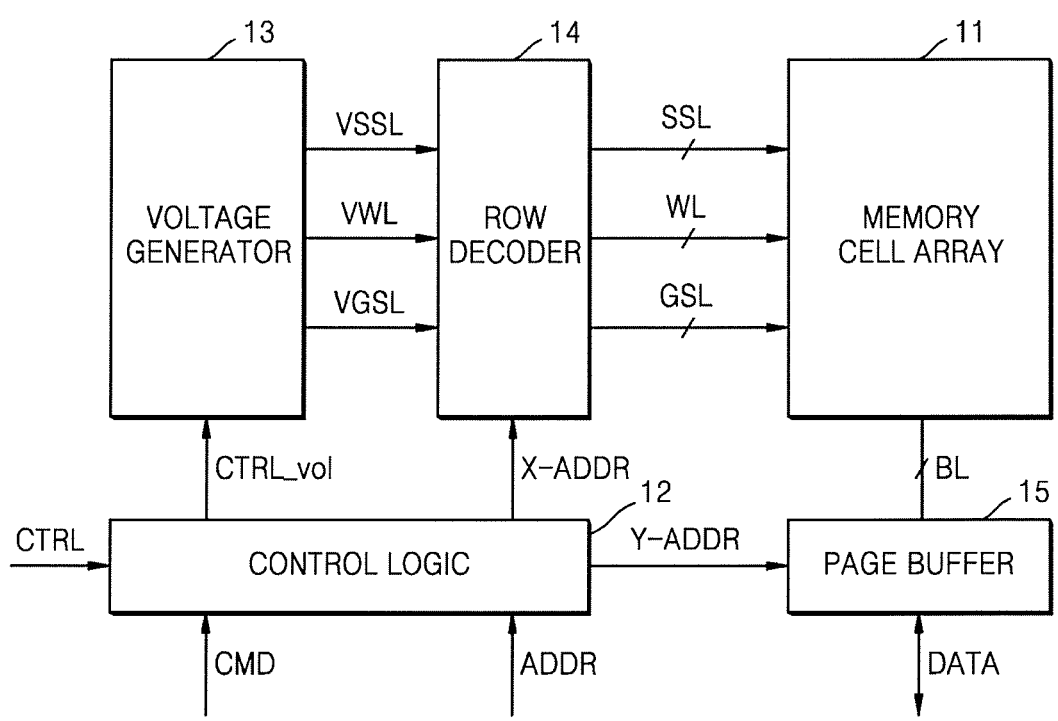
FIG. 4 is a block diagram of a non-volatile memory (NVM) chip included in a memory device of FIGS. 1 and 2 according to an exemplary embodiment of the inventive concept.

FIG. 4 is a block diagram of the NVM chip 210 included in the memory device 200 of FIGS. 1 and 2 according to an exemplary embodiment of the inventive concept.

Referring to FIG. 4, the NVM chip 210 may include, for example, a memory cell array 11, a control logic 12, a voltage generator 13, a row decoder 14, and a page buffer 15.

The memory cell array 11 may be connected to one or more string selection lines SSL, a plurality of word lines WL, and one or more ground selection lines GSL. The memory cell array 11 may also be connected to a plurality of bit lines BL. The memory cell array 11 may include a plurality of memory cells MC (see, e.g., FIGS. 6, 7, and 9) that are disposed at points where the plurality of word lines WL and the plurality of bit lines BL intersect each other.

When an erase voltage is applied to the memory cell array 11, the plurality of memory cells MC change to an erase state, and when a program voltage is applied to the memory cell array 11, the plurality of memory cells MC change to a program state. In this case, each of the memory cells MC may have one state selected from an erase state and first through nth program states P1 through Pn that are defined according to a threshold voltage.

Here, n may be a natural number greater than or equal to 2. For example, when each of the memory cells MC is a 2-bit level cell, n may be 3. Alternatively, when each of the memory cells MC is a 3-bit level cell, n may be 7. Alternatively, when each of the memory cells MC is a 4-bit level cell, n may be 15. Thus, the plurality of memory cells MC may include multi-level cells. However, exemplary embodiments of the present inventive concept are not limited thereto. For example, the plurality of memory cells MC may include single-level cells.

The control logic 12 may output various control signals for writing data to the memory cell array 11 or reading data from the memory cell array 11 based on a command CMD, an address ADDR, and a control signal CTRL that are received from the memory controller 100. Accordingly, the control logic 12 may control various operations in the memory device 200.

The various control signals that are output from the control logic 12 may be applied to the voltage generator 13, the row decoder 14, and the page buffer 15. For example, the control logic 12 may apply a voltage control signal CTRL_vol to the voltage generator 13, a row address X_ADDR to the row decoder 14, and a column address Y_ADDR to the page buffer 15.

The voltage generator 13 may generate various voltages for performing a program operation, a read operation, and an erase operation on the memory cell array 11 based on the voltage control signal CTRL_vol. For example, the voltage generator 13 may generate a first driving voltage VWL for driving the plurality of word lines WL, a second driving voltage VSSL for driving the plurality of string selection lines SSL, and a third driving voltage VGSL for driving the plurality of ground selection lines GSL.

In this case, the first driving voltage VWL may be a program voltage (or a write voltage), a read voltage, an erase voltage, a pass voltage, or a program verification voltage. The second driving voltage VSSL may be a string selection voltage (e.g., an on voltage or an off voltage). The third driving voltage VGSL may be a ground selection voltage (e.g., an on voltage or an off voltage).

In FIG. 4, when a program loop starts based on the voltage control signal CTRL_vol (e.g., when the number of program loops is 1), the voltage generator 13 may generate a program start voltage as a program voltage. Further, as the number of program loops increases, the voltage generator 13 may generate a voltage that gradually increases by as much as a step voltage from the program start voltage as a program voltage.

The row decoder 14 may be connected to the memory cell array 11 through the plurality of word lines WL and may activate some of the plurality of word lines WL in response to the row address X_ADDR that is received from the control logic 12. For example, during a read operation, the row decoder 14 may apply a read voltage to selected word lines and a pass voltage to non-selected word lines.

During a program operation, the row decoder 14 may apply a program voltage to selected word lines and a pass voltage to non-selected word lines. In FIG. 4, during at least one of the program loops, the row decoder 14 may apply a program voltage to selected word lines and additionally selected word lines.

The page buffer 15 may be connected to the memory cell array 11 through the plurality of bit lines BL. For example, during a read operation, the page buffer 15 may operate as a sense amplifier and may output data DATA that is stored in the memory cell array 11. During a program operation, the page buffer 15 may operate as a write driver and may input the data DATA that is to be stored in the memory cell array 11.

Figure 5:
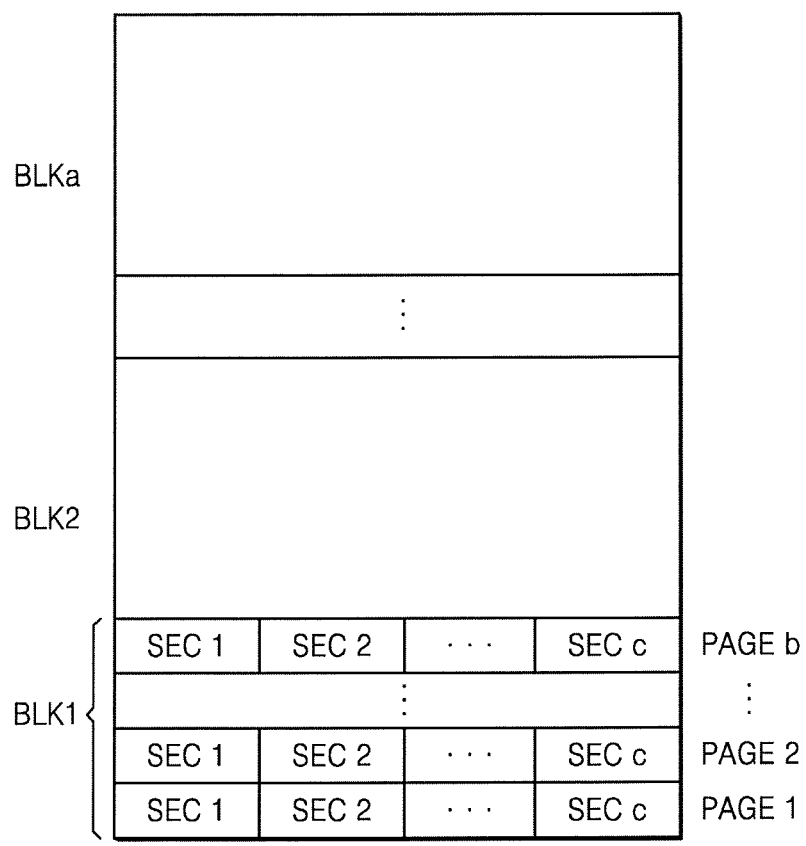
FIG. 5 is a diagram of a memory cell array of FIG. 4 according to an exemplary embodiment of the inventive concept.

FIG. 5 is a diagram of the memory cell array 11 of FIG. 4 according to an exemplary embodiment of the inventive concept.

Referring to FIG. 5, the memory cell array 11 may be, for example, a flash memory cell array. In this case, the memory cell array 11 may include a (where a is an integer greater than or equal to 2) memory blocks BLK1 through BLKa. Each of the memory blocks BLK1 through BLKa may include b (where b is an integer greater than or equal to 2) pages PAGE 1 through PAGE b, and each of the pages PAGE 1 through PAGE b may include c (where c is an integer greater than or equal to 2) sectors SEC1 through SECc. Although only the pages PAGE0 through PAGEb and the sectors SEC1 through SECc of the memory block BLK1 are illustrated in FIG. 5 for convenience of explanation, it is to be understood that the other memory blocks BLK2 through BLKa may have the same structure as that of the memory block BLK1.

Figure 6:
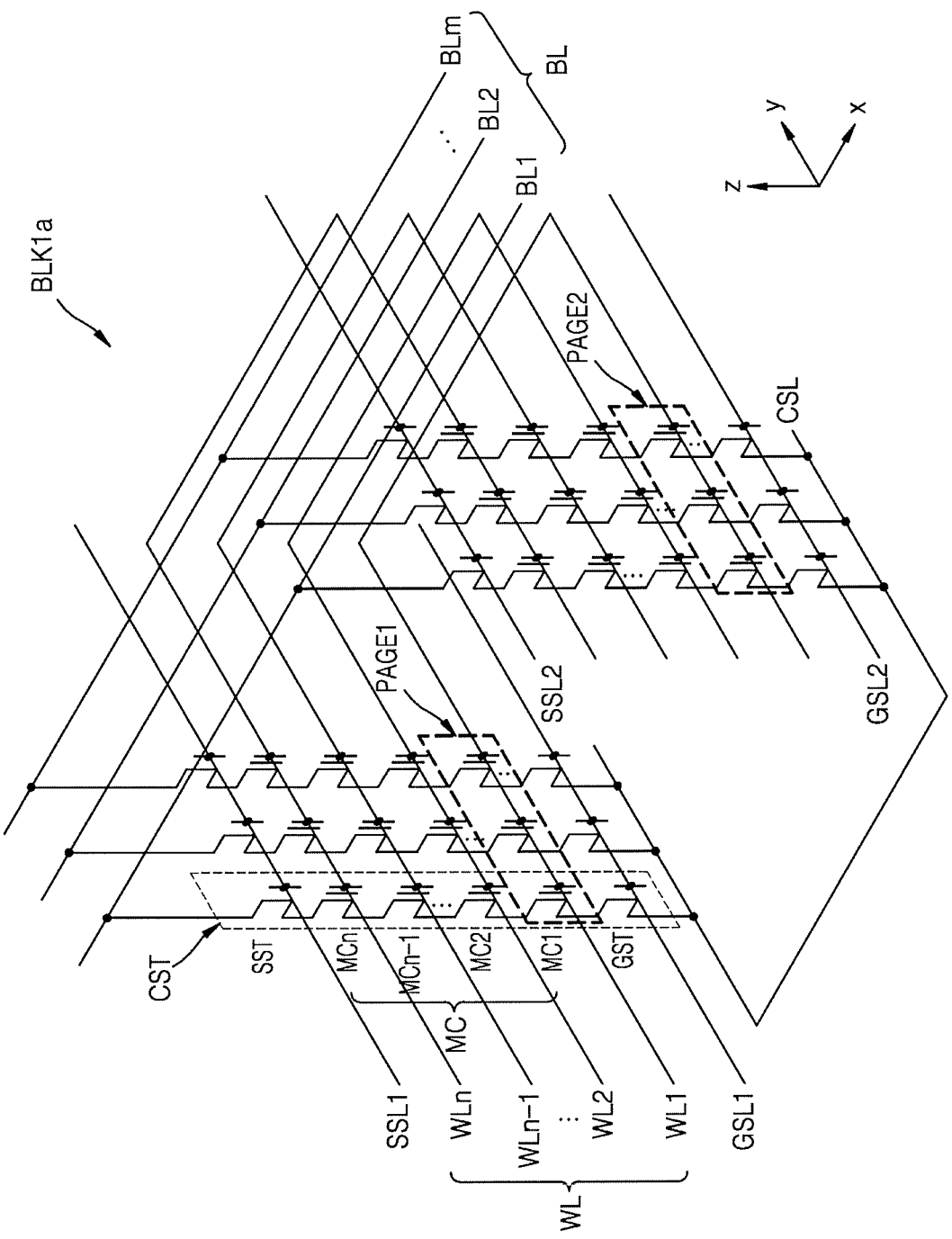
FIG. 6 is a circuit diagram of a first memory block included in the memory cell array of FIG. 5 according to an exemplary embodiment of the inventive concept.

FIG. 6 is a circuit diagram of the memory block BLK1a (hereinafter, referred to as a first memory block BLK1a) included in the memory cell array 11 of FIG. 5 according to an exemplary embodiment of the inventive concept.

Referring to FIG. 6, the first memory block BLK1a may be, for example, a vertical NAND flash memory. In this case, each of the memory blocks BLK1 through BLKa of FIG. 5 may have the structure as shown in FIG. 6. In FIG. 6, a first direction is an x direction, a second direction is a y direction, and a third direction is a z direction. However, exemplary embodiments are not limited thereto, and the first through third directions may be changed.

The first memory block BLK1a may include a plurality of cell strings CST, a plurality of word lines WL (e.g., WL1 to WLn), a plurality of bit lines BL (e.g., BL1 to BLm), a plurality of ground selection lines GSL (e.g., first and second ground selection lines GSL1 and GSL2), a plurality of string selection lines SSL (e.g., first and second string selection lines SSL1 and SSL2), and a common source line CSL. The number of cell strings CST, the number of word lines WL, the number of bit lines BL, the number of ground selection lines GSL, and the number of string selection lines SSL may vary according to exemplary embodiments.

Each of the cell strings CST may include a string selection transistor SST, a plurality of memory cells MC (e.g., MC1 to MCn), and a ground selection transistor GST that are serially connected between the respective cell string's CST corresponding bit line BL and the common source line CSL. However, exemplary embodiments are not limited thereto. For example, the cell string CST may further include at least one dummy cell. Alternatively, the cell string CST may include at least two string selection transistors or at least two ground selection transistors.

The cell string CST may extend in the third direction (e.g., the z direction). For example, the cell string CST may extend in a direction (e.g., the z direction) perpendicular to a substrate 710 (see FIG. 7). Accordingly, the first memory block BLK1a, including the cell string CST, may be referred to as a vertical NAND flash memory. As such, since the cell string CST extends in the direction (e.g., the z direction) perpendicular to the substrate 710, the degree of integration of the memory cell array 11 may be increased.

The plurality of word lines WL may extend in the first direction (e.g., the x direction) and the second direction (e.g., the y direction) and may be respectively connected to the memory cells MC corresponding to the word lines WL. Accordingly, the plurality of memory cells MC that are arranged adjacent to each other in the first direction (e.g., the x direction) and the second direction (e.g., the y direction) on the same layer may be connected to the same word line WL. For example, each of the word lines WL may be connected to gates of the memory cells MC that are arranged adjacent to each other in the first direction (e.g., the x direction) and the second direction (e.g., the y direction) on the same layer and may control the memory cells MC. In this case, the plurality of memory cells MC may store data and may perform a program operation, a read operation, or an erase operation under the control of the word line WL connected to the plurality of memory cells MC.

The plurality of bit lines BL may extend in the first direction (e.g., the x direction) and may be connected to the string selection transistors SST. Accordingly, the plurality of string selection transistors SST that are arranged adjacent to each other in the first direction (e.g., the x direction) may be connected to the same bit line BL. For example, each of the bit lines BL may be connected to drains of the string selection transistors SST.

The plurality of string selection lines SSL (e.g., the first and second string selection lines SSL1 and SSL2) may extend in the second direction (e.g., the y direction) and may be connected to the string selection transistors SST. Accordingly, the plurality of string selection transistors SST that are arranged adjacent to each other in the second direction (e.g., the y direction) may be connected to the same string selection line (e.g., the first or second string selection line SSL1 or SSL2). For example, each of the first and second string selection lines SSL1 and SSL2 may be connected to gates of the string selection transistors SST and may control the string selection transistors SST.

The plurality of ground selection lines GSL (e.g., the first and second ground selection lines GSL1 and GSL2), may extend in the second direction (e.g., the y direction) and may be connected to the ground selection transistors GST. Accordingly, the plurality of ground selection transistors GST that are arranged adjacent to each other in the second direction (e.g., the y direction) may be connected to the same ground selection line (e.g., the first or second ground selection line GSL1 or GSL2). For example, each of the ground selection line GSL1 and GSL2 may be connected to gates of the ground selection transistors GST and may control the ground selection transistors GST.

The ground selection transistors GST that are included in the cell strings CST may be commonly connected to the common source line CSL. For example, the common source line CSL may be connected to sources of the ground selection transistors GST.

The plurality of memory cells MC that are commonly connected to the same word line WL and the same string selection line (e.g., the first or second string selection line SSL1 or SSL2) and are arranged adjacent to each other in the second direction (e.g., the y direction) may be referred to as a page PAGE. For example, the plurality of memory cells MC that are commonly connected to the word line WL1 (hereinafter referred to as a first word line WL1) are commonly connected to the first string selection line SSL1, and are arranged adjacent to each other in the second direction (e.g., the y direction) may be referred to as a first page PAGE1. The plurality of memory cells MC that are commonly connected to the first word line WL1, are commonly connected to the second string selection line SSL2, and are arranged adjacent to each other in the second direction (e.g., the y direction) may be referred to as a second page PAGE2.

In order to perform a program operation on the memory cells MC, a voltage of 0 V may be applied to the bit lines BL, an ON voltage may be applied to the string selection lines SSL, and an OFF voltage may be applied to the ground selection lines GSL. The ON voltage may be about equal to or greater than a threshold voltage in order to turn on the string selection transistors SST, and the OFF voltage may be less than the threshold voltage in order to turn off the ground selection transistors GST. A program voltage may be applied to selected memory cells from among the memory cells MC, and a pass voltage may be applied to the remaining memory cells. Once the program voltage is applied, charges may be injected into the memory cells MC due to F-N (Fowler-Nordheim) tunneling. The pass voltage may be greater than the threshold voltage of the memory cells MC.

In order to perform an erase operation on the memory cells MC, an erase voltage may be applied to a body of the memory cells MC and a voltage of 0 V may be applied to the word lines WL. Accordingly, data of the memory cells MC may be erased at one time.

Figure 7:
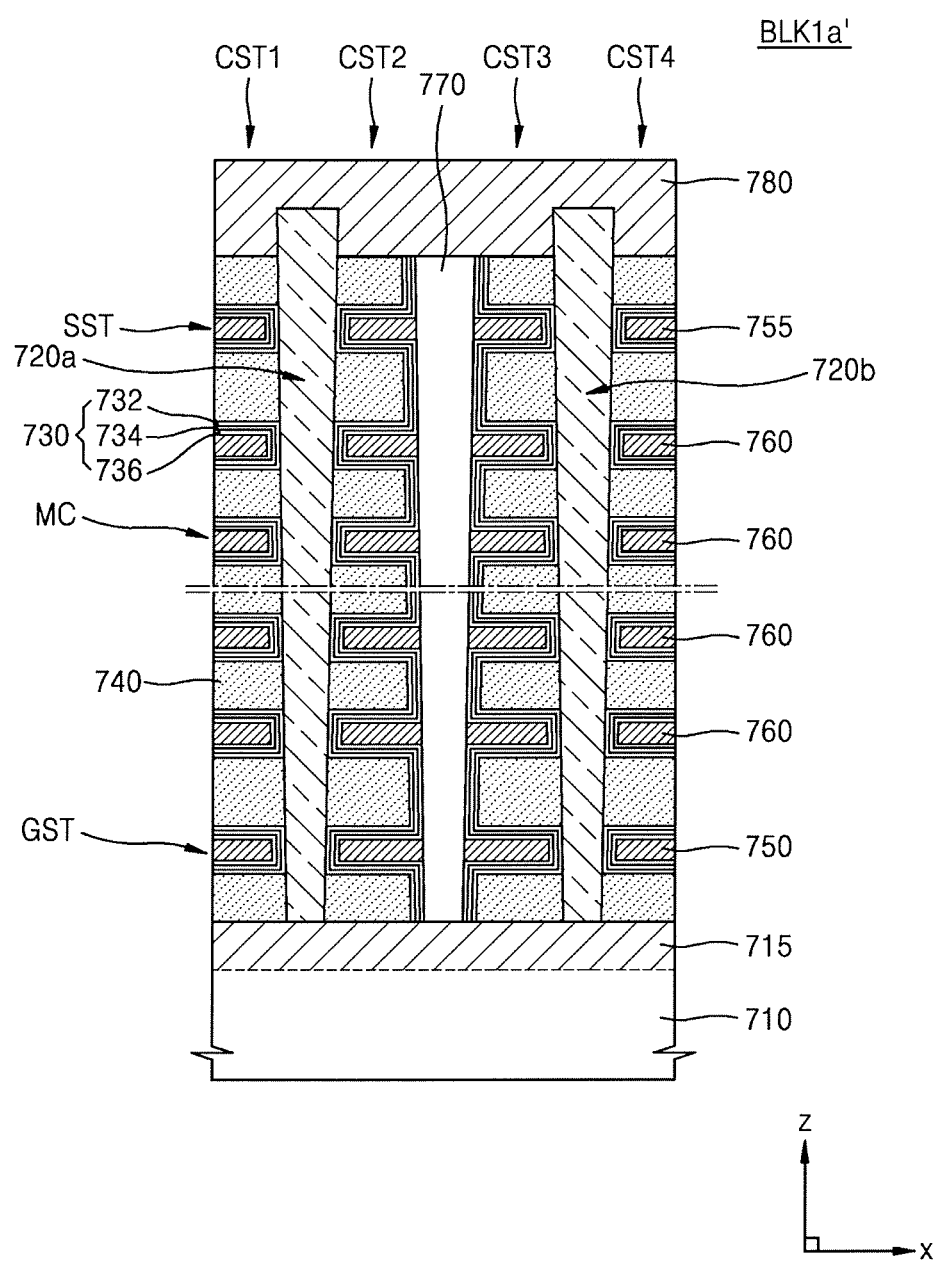
FIG. 7 is a cross-sectional view illustrating a first memory block that is a modification of the first memory block of FIG. 6 in a bit line direction according to an exemplary embodiment of the inventive concept.
Figure 8:
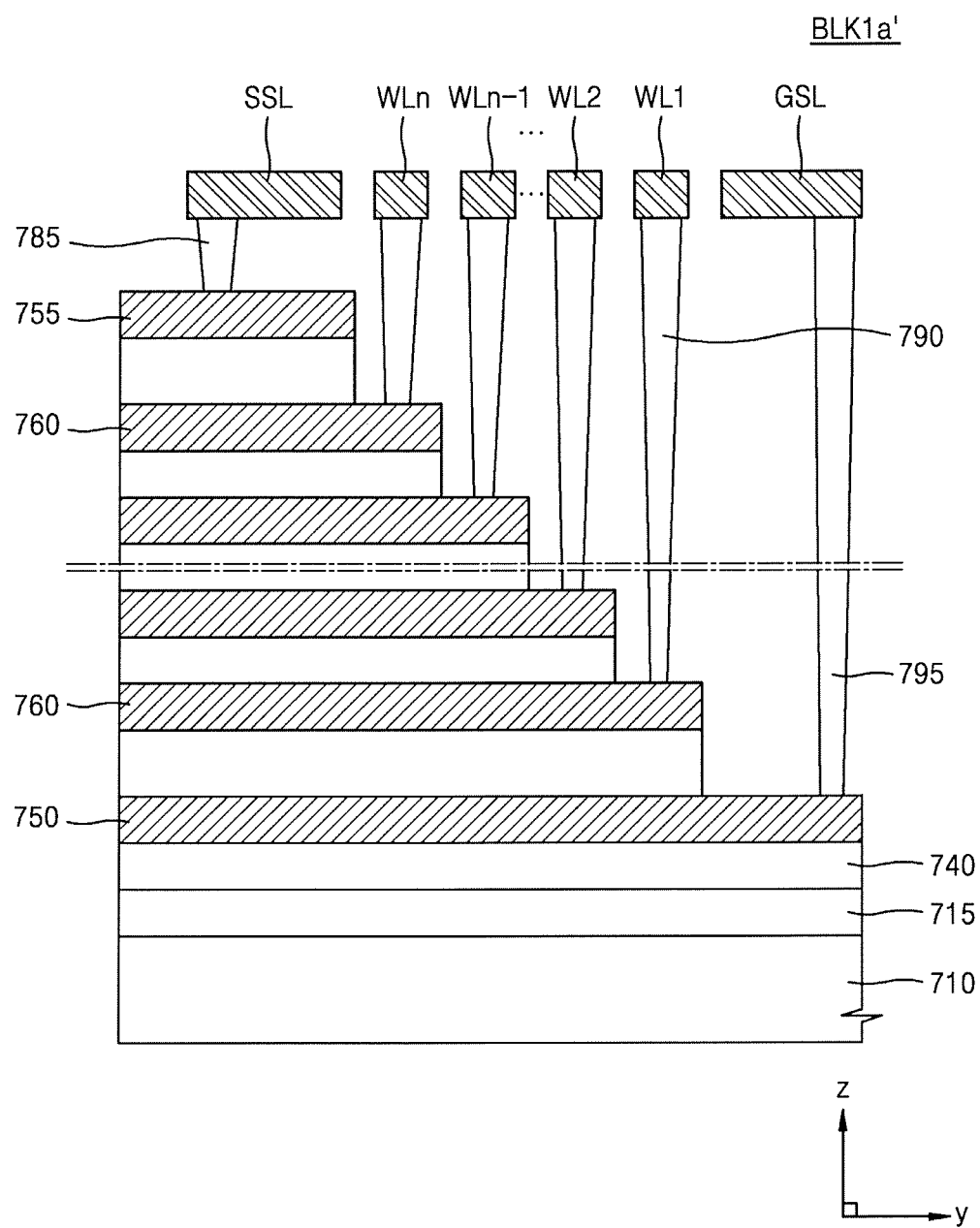
FIG. 8 is a cross-sectional view illustrating the first memory block of FIG. 6 in a word line direction according to an exemplary embodiment of the inventive concept.

FIG. 7 is a cross-sectional view illustrating a first memory block BLK1a' that is a modification of the first memory block BLK1a of FIG. 6 in a bit line direction according to an exemplary embodiment of the inventive concept. FIG. 8 is a cross-sectional view illustrating the first memory block BLK1a' in a word line direction according to an exemplary embodiment of the inventive concept.

Referring to FIGS. 7 and 8, the first memory block BLK1a' may include a substrate 710 having a main surface that extends in the first direction (e.g., the x direction). The substrate 710 may include a semiconductor material such as, for example, a group IV semiconductor, a group III-V compound semiconductor, or a group II-VI oxide semiconductor. Examples of the group IV semiconductor may include silicon, germanium, and silicon-germanium. In this case, the substrate 710 may be provided as a bulk wafer or an epitaxial layer.

Semiconductor pillars 720a and 720b may be disposed on the substrate 710. The semiconductor pillars 720a and 720b may vertically extend from the substrate 710 (e.g., in the z direction). Each of the semiconductor pillars 720a and 720b may include a semiconductor material such as, for example, a polycrystalline silicon or monocrystalline silicon. The semiconductor material may not be doped, or may include p-type or n-type impurities.

The substrate 710 may include an impurity region 715 that is formed under the semiconductor pillars 720a and 720b. The impurity region 715 may be a source region and may form a PN junction with another region of the substrate 710. The common source line CSL may be connected to the impurity region 715. Alternatively, the impurity region 715 may be disposed under only lower ends of the semiconductor pillars 720a and 720b. That is, in an exemplary embodiment, the impurity region 715 may include two sections disconnected from each other, each being disposed under and aligned with the semiconductor pillars 720a and 720b, respectively.

Each of the memory cells MC may include a storage medium 730 that is formed on a side wall of each of the semiconductor pillars 720a and 720b, and a control gate electrode 760 that is formed on the storage medium 730. Each storage medium 730 may include a tunneling insulating layer 732 that is formed on a side wall of each of the semiconductor pillars 720a and 720b, a charge storage layer 734 that is formed on the tunneling insulating layer 732, and a blocking insulating layer 736 that is formed on the charge storage layer 734.

The charge storage layer 734 may store electric charges. For example, the charge storage layer 734 may be a charge trapping layer and may include, for example, a silicon nitride layer, quantum dots, or nanocrystals. The quantum dots or the nanocrystals may include a conductor such as metal or semiconductor particles. Each of the tunneling insulating layer 732 and the blocking insulating layer 736 may include an oxide film, a nitride film, or a high-k film. The high-k film may be a dielectric film having a higher dielectric constant than that of the oxide film and the nitride film.

The string selection transistor SST may include a string selection gate electrode 755 that is formed on the side wall of each of the semiconductor pillars 720a and 720b. The string selection transistor SST may be connected to a bit line 780. The bit line 780 may have a linear pattern that extends in the first direction (e.g., the x direction). The ground selection transistor GST may include a ground selection gate electrode 750 that is formed on the side wall of each of the semiconductor pillars 720a and 720b.

The storage medium 730 disposed between the string selection transistor SST and each of the semiconductor pillars 720a and 720b and between the ground selection transistor GST and each of the semiconductor pillars 720a and 720b may function as a gate insulating layer, and in an exemplary embodiment, may be replaced with one insulating layer. Interlayer insulating layers 740 may be disposed between the ground selection gate electrode 750, the control gate electrodes 760, and the string selection gate electrodes 755. The storage medium 730 may extend along surfaces of the interlayer insulating layers 740.

First and second cell strings CST1 and CST2 may be disposed adjacent to each other with the semiconductor pillar 720a disposed therebetween, and third and fourth cell strings CST3 and CST4 may be disposed adjacent to each other with the semiconductor pillar 720b disposed therebetween. An insulating layer 770 may be disposed between the second cell string CST2 and the third cell string CST3.

The string selection gate electrode 755 may be connected to the string selection line SSL through a contact plug 785. The control gate electrodes 760 may be connected to word lines WL1 through WLn that respectively correspond to the control gate electrodes 760 through contact plugs 790. The ground selection gate electrode 750 may be connected to the ground selection line GSL through a contact plug 795.

Figure 9:
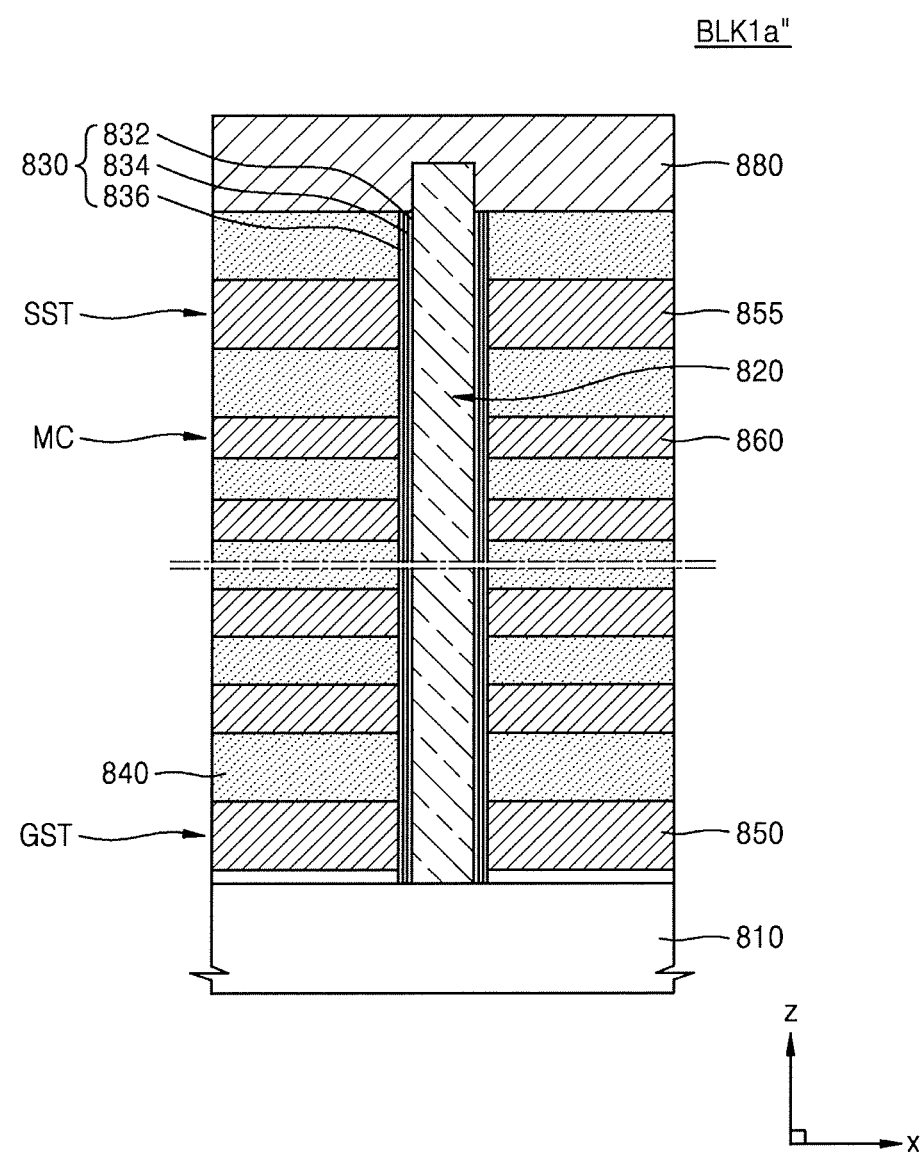
FIG. 9 is a cross-sectional view illustrating a first memory block that is a modification of the first memory block of FIG. 6 in the bit line direction according to an exemplary embodiment of the inventive concept.

FIG. 9 is a cross-sectional view illustrating a first memory block BLK1a'' that is a modification of the first memory block BLK1a of FIG. 6 in the bit line direction according to an exemplary embodiment of the inventive concept.

Referring to FIG. 9, the first memory block BLK1a'' may include a substrate 810 having a main surface that extends in the first direction (e.g., the x direction). The substrate 810 may include a semiconductor material such as, for example, a group IV semiconductor, a group III-V compound semiconductor, or a group II-VI oxide semiconductor. Examples of the group IV semiconductor may include silicon, germanium, and silicon-germanium. In this case, the substrate 810 may be provided as a bulk wafer or an epitaxial layer.

A semiconductor pillar 820 may be disposed on the substrate 810. The semiconductor pillar 820 may vertically extend from the substrate 810 in the z direction. The semiconductor pillar 820 may include a semiconductor material such as, for example, polycrystalline silicon or monocrystalline silicon. The semiconductor material may not be doped, or may include p-type or n-type impurities.

A storage medium 830 may be formed to extend in a longitudinal direction of the semiconductor pillar 820. The storage medium 830 may include a tunneling insulating layer 832 that is formed on a side wall of the semiconductor pillar 820, a charge storage layer 834 that is formed on the tunneling insulating layer 832, and a blocking insulating layer 836 that is formed on the charge storage layer 834.

The string selection transistor SST may include a string selection gate electrode 855 that is formed on the side wall of the semiconductor pillar 820. The string selection transistor SST may be connected to a bit line 880. The bit line 880 may have a linear pattern that extends in the first direction (e.g., the x direction). Each ground selection transistor GST may include a ground selection gate electrode 850 that is formed on the side wall of the semiconductor pillar 820.

The storage medium 830 that is formed between the string selection transistor SST and the semiconductor pillar 820, and between the ground selection transistor GST and the semiconductor pillar 820, may function as a gate insulating layer, and in an exemplary embodiment, may be replaced with one insulating layer. Interlayer insulating layers 840 may be disposed between the ground selection gate electrode 850, control gate electrodes 860, and the string selection gate electrodes 855.

Figure 10:
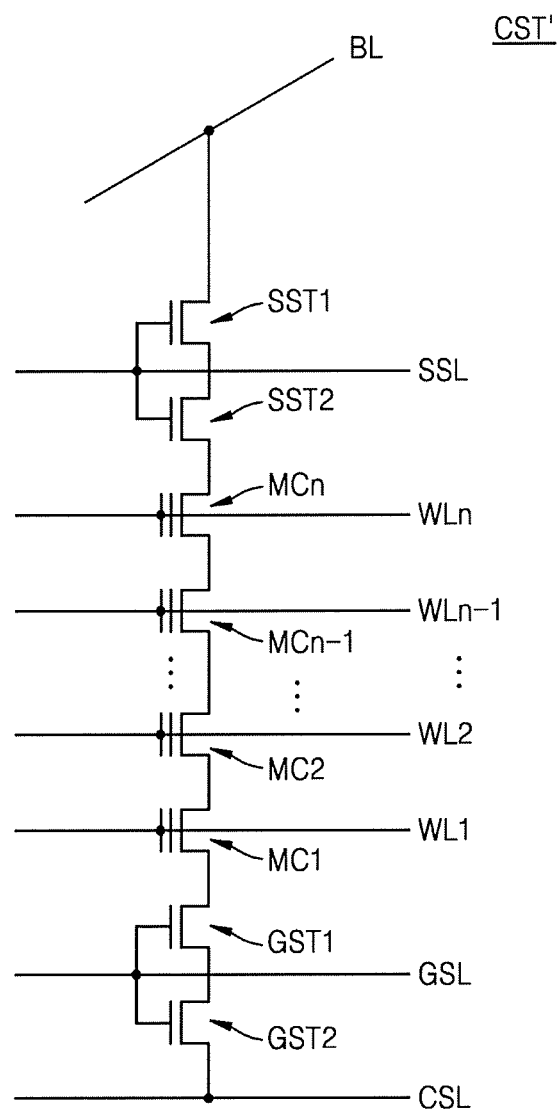
FIG. 10 is a circuit diagram of a cell string that is a modification of a cell string included the first memory block of FIG. 6 according to an exemplary embodiment of the inventive concept.

FIG. 10 is a circuit diagram of a cell string CST' that is a modification of the cell string CST included in the first memory block BLK1a of FIG. 6 according to an exemplary embodiment of the inventive concept.

Referring to FIG. 10, the cell string CST' may include at least one pair of string selection transistors SST1 and SST2, the plurality of memory cells MC (e.g., MC1 to MCn), and at least one pair of ground selection transistors GST1 and GST2. The bit line BL may be connected to one end of the cell string CST', and the common source line CSL may be connected to the other end of the cell string CST'.

Some of the elements included in the cell string CST' of FIG. 10 are substantially the same as those included in the cell string CST of FIG. 6. These elements may be denoted by the same reference numerals, and a repeated explanation thereof may be omitted herein, with the following description focusing on differences between the cell string CST of FIG. 6 and the cell string CST' of FIG. 10.

The plurality of memory cells MC may be vertically and serially arranged. The memory cells MC may store data. The plurality of word lines WL (e.g., WL1 to WLn) may be connected to the memory cells MC and may control the memory cells MC. The number of memory cells MC may be appropriately determined according to a capacity of a non-volatile memory device.

The at least one pair of string selection transistors SST1 an SST2 may be arranged adjacent to each other at one side of the memory cells MC. For example, the string selection transistors SST1 and SST2 may be disposed between the bit line BL and the nth memory cell MCn and may be serially connected to the nth memory cell MCn. The string selection transistors SST1 and SST2 may control signal transmission between the bit line BL and the memory cells MC. The string selection line SSL may be commonly connected to the string selection transistors SST1 and SST2. Accordingly, the string selection transistors SST1 and SST2 may operate like one transistor.

The at least one pair of ground selection transistors GST1 and GST2 may be arranged adjacent to each other at the other side of the memory cells MC to be opposite to the string selection transistors SST1 and SST2. For example, the ground selection transistors GST1 and GST2 may be disposed between the common source line CSL and the first memory cell MC1, and may be serially connected to the first memory cell MC1. The ground selection transistors GST1 and GST2 may control signal transmission between the common source line CSL and the memory cells MC. The ground selection line GSL may be commonly connected to the ground selection transistors GST1 and GST2. Accordingly, the ground selection transistors GST1 and GST2 may operate like one transistor.

In FIG. 10, since the number of string selection transistors SST1 and SST2 is at least 2, a length of each of the string selection gate electrodes 755 (see FIG. 7) may be greatly reduced compared to when the number of string selection transistors is 1, thereby filling a space between the interlayer insulating layers 740 (see FIG. 7) without voids. Moreover, since the number of ground selection transistors GST1 and GST2 is at least 2, a length of the ground selection gate electrodes 750 (see FIG. 7) may be greatly reduced compared to when the number of ground selection transistors is 1, thereby filling a space between the interlayer insulating layers 740 (see FIG. 7) without voids.

Figure 11:
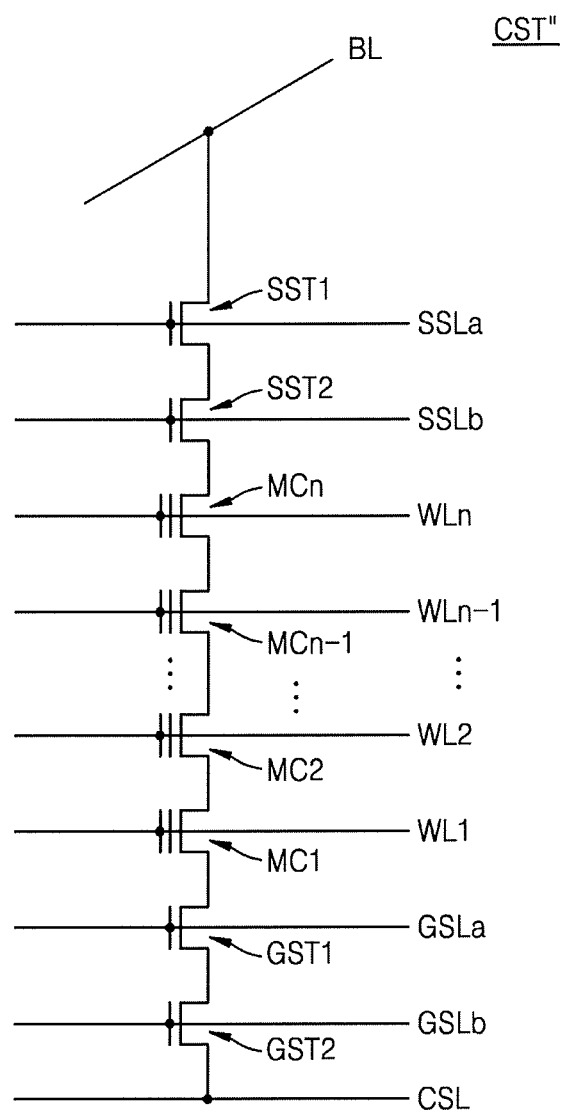
FIG. 11 is a circuit diagram of a cell string that is a modification of the cell string included in the first memory block of FIG. 6 according to an exemplary embodiment of the inventive concept.

FIG. 11 is a circuit diagram of a cell string CST" that is a modification of the cell string CST included in the first memory block BLK1a of FIG. 6 according to an exemplary embodiment of the inventive concept.

Referring to FIG. 11, the cell string CST" may include at least one pair of string selection transistors SST1 and SST2, the plurality of memory cells MC (e.g., MC1 to MCn), and at least one pair of ground selection transistors GST1 and GST2. The bit line BL may be connected to one end of the cell string CST", and the common source line CSL may be connected to the other end of the cell string CST".

Some of the elements included in the cell string CST" of FIG. 11 are substantially the same as those included in the cell string CST' of FIG. 10. These elements may be denoted by the same reference numerals, and a repeated explanation thereof may be omitted, with the following description focusing on differences between the cell string CST' of FIG. 10 and the cell string CST" of FIG. 11.

The at least one pair of string selection transistors SST1 and SST2 may be arranged adjacent to each other at one side of the memory cells MC. For example, the string selection transistors SST1 and SST2 may be disposed between the bit line BL and the nth memory cell MCn and may be serially connected to the nth memory cell MCn. The string selection transistors SST1 and SST2 may control signal transmission between the bit line BL and the memory cells MC. In this case, a first string selection line SSLa may be connected to the string selection transistor SST1 and a second string selection line SSLb may be connected to the string selection transistor SST2.

The at least one pair of ground selection transistors GST1 and GST2 may be arranged adjacent to each other at the other side of the memory cells MC to be opposite to the string selection transistors SST1 and SST2. For example, the ground selection transistors GST1 and GST2 may be disposed between the common source line CSL and the first memory cell MC1, and may be serially connected to the first memory cell MC1. The ground selection transistors GST1 and GST2 may control signal transmission between the common source line CSL and the memory cells MC. In this case, a first ground selection line GSLa may be connected to the ground selection transistor GST1 and a second ground selection line GSLb may be connected to the ground selection transistor GST2.

Figure 12:
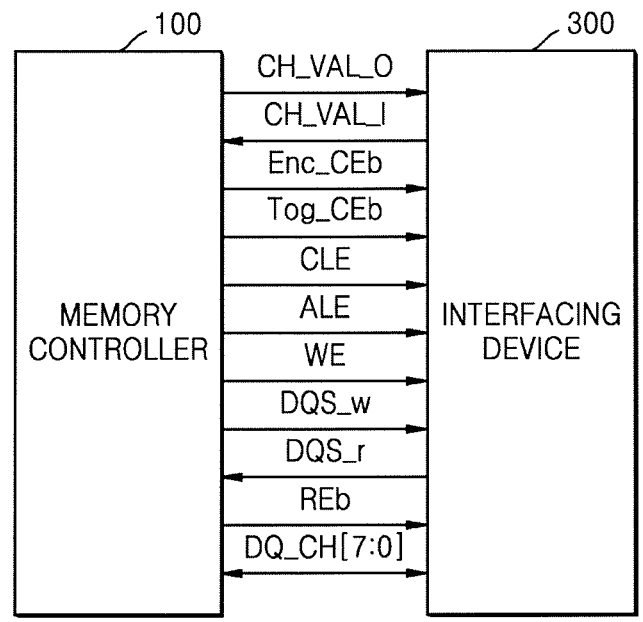
FIG. 12 is a diagram of a layout of input/output (I/O) ports with respect to a physical channel between a memory controller and an interfacing device in a memory system according to an exemplary embodiment of the inventive concept.

FIG. 12 is a diagram of a layout of I/O ports with respect to the physical channel 500 between the memory controller 100 and the interfacing device 300 in the memory system 1000 of FIG. 1 or the memory system 2000 of FIG. 2 according to an exemplary embodiment of the inventive concept.

Referring to FIG. 12, the I/O ports with respect to the physical channel 500 between the memory controller 100 and the interfacing device 300 may include ports for transmitting signals CH_VAL_O and CH_VAL_I with respect to channel information, a port for transmitting a signal Enc_CEb with respect to encoded chip enable information, a port for transmitting a toggle signal Tog_CEb indicating a timing when a corresponding chip number is enabled and disabled, a port for transmitting a command latch enable signal CLE, a port for transmitting an address latch enable signal ALE, a port for transmitting a write enable signal WE, a port for transmitting a read enable signal REb, a port for transmitting a flash write data strobe signal DQS_w, a port for transmitting a flash read data strobe signal DQS_r, and ports for transmitting data DQ_CH[7:0] by a specific channel according to a channel configuration. In this regard, the signal CH_VAL_O, the signal CH_VAL_I, the signal Enc_CEb, the toggle signal Tog_CEb, the command latch enable signal CLE, the address latch enable signal ALE, the write enable signal WE, the read enable signal REb, the flash write data strobe signal DQS_w, and the flash read data strobe signal DQS_r correspond to control signals, and the data DQ_CH[7:0] corresponds to data.

The signal CH_VAL_O is a signal indicating a selected virtual channel number and is output from the memory controller 100 to the interfacing device 300. The signal CH_VAL_I is a signal indicating a virtual channel number used to transmit data from the interfacing device 300 to the memory controller 100. The signal Enc_CEb may encode signals with respect to 8 ways as 3 signals to be identified when a single virtual channel includes 8 ways. The flash write data strobe signal DQS_w and the flash read data strobe signal DQS_r are separately used in order to simultaneously perform flash write and read operations for virtual channels.

Although FIG. 12 shows DQ_CH as including 8 bits, it is to be understood that DQ_CH is not limited thereto. For example, DQ_CH may include a number of bits greater than 2 bits. For example, when a single physical channel includes 4 or more virtual channels, 2 bits may be assigned to DQ_CH[7:0] to transmit data to each of the virtual channels. In another example, when a single physical channel includes 8 virtual channels, 1 bit may be assigned to DQ_CH[7:0] to transmit data to each of the virtual channels.

Figure 13:
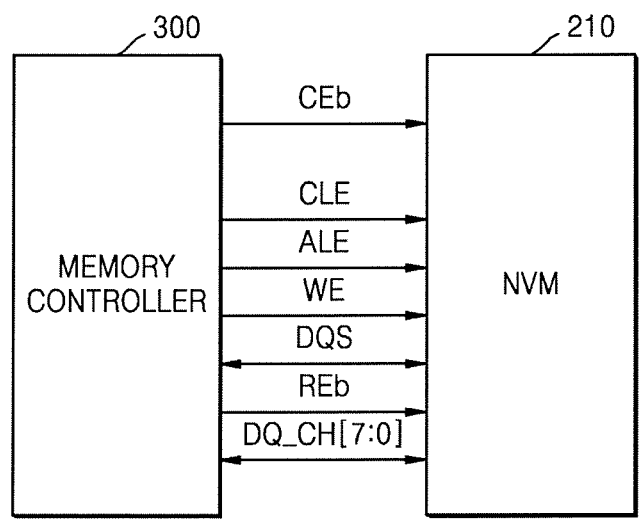
FIG. 13 is a diagram of a layout of I/O ports with respect to virtual channels between an interfacing device and a non-volatile memory (NVM) chip in a memory system according to an exemplary embodiment of the inventive concept.

FIG. 13 is a diagram of a layout of I/O ports with respect to the virtual channels 600 between the interfacing device 300 and the NVM chip 210 in the memory system 1000 of FIG. 1 or the memory system 2000 of FIG. 2 according to an exemplary embodiment of the inventive concept.

Referring to FIG. 13, the I/O ports with respect to the virtual channels 600 between the interfacing device 300 and the NVM chip 210 may include a port for transmitting a chip enable signal CEb, a port for transmitting a command latch enable signal CLE, a port for transmitting an address latch enable signal ALE, a port for transmitting a write enable signal WE, a port for transmitting a read enable signal REb, a port for transmitting a data strobe signal DQS, and ports for transmitting data DQ_CH[7:0].

Figure 14:
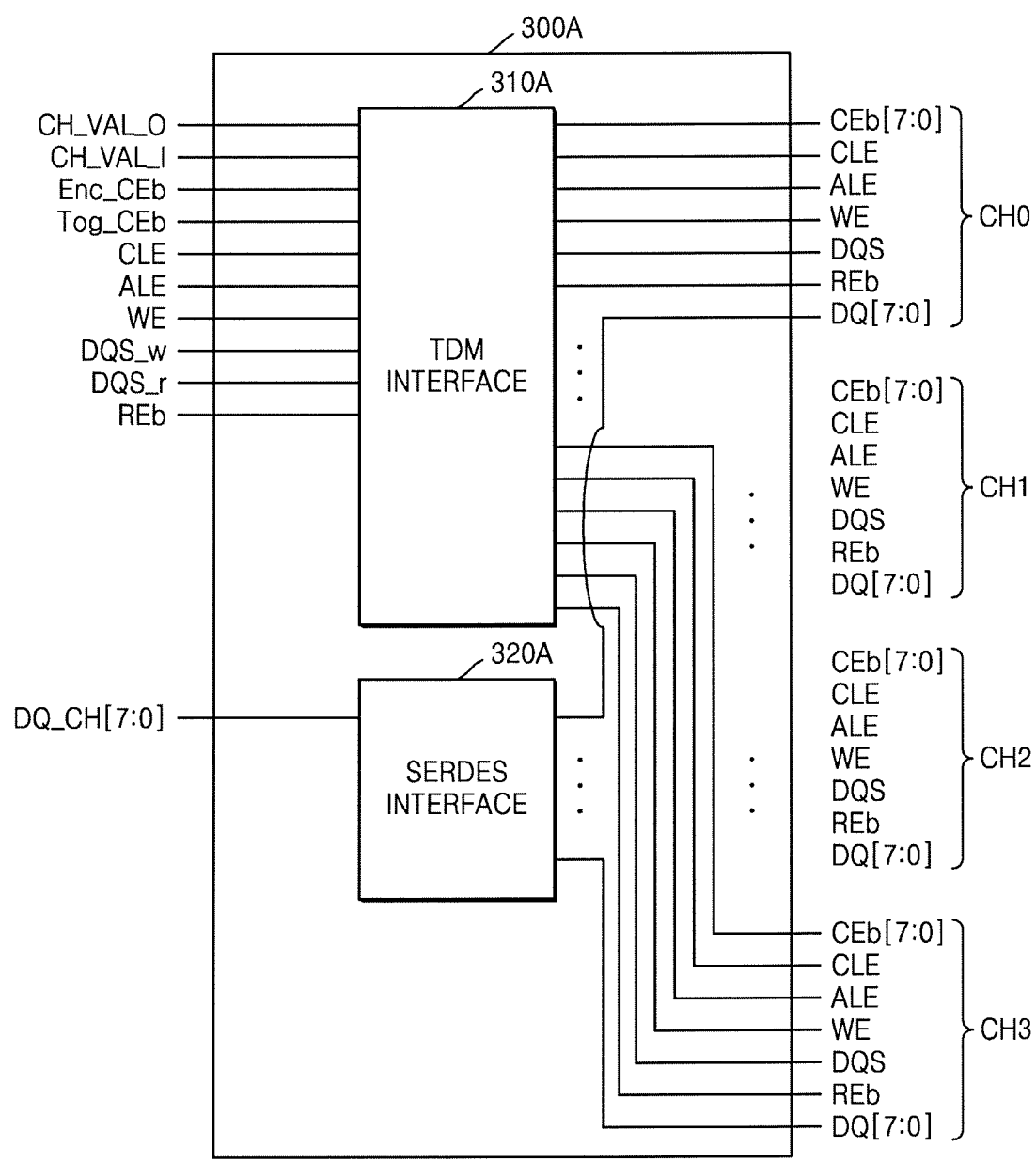
FIG. 14 is a block diagram of an interfacing device of FIGS. 1 and 2 according to an exemplary embodiment of the inventive concept.

FIG. 14 is a block diagram of an interfacing device 300A as an example of the interfacing device 300 of FIGS. 1 and 2, according to an exemplary embodiment of the inventive concept. FIG. 14 shows an example of interfacing in which four virtual channels CH0~CH3 correspond to the single physical channel 500.

Referring to FIG. 14, a TDM interface 310A receives or outputs control signals via input/output ports connected to the memory controller 100 via the physical channel 500. For example, the TDM interface 310A may input or output control signals such as the signal CH_VAL_O, the signal CH_VAL_I, the signal Enc_CEb, the toggle signal Tog_CEb, the command latch enable signal CLE, the address latch enable signal ALE, the write enable signal WE, the read enable signal REb, the flash write data strobe signal DQS_w, and the flash read data strobe signal DQS_r via the physical channel 500 based on TDM interfacing. For example, the TDM interface 310A inputs the signal CH_VAL_O, the signal Enc_CEb, the toggle signal Tog_CEb, the command latch enable signal CLE, the address latch enable signal ALE, the write enable signal WE, the read enable signal REb, and the flash write data strobe signal DQS_w from the memory controller 100 via the physical channel 500. The TDM interface 310A outputs the signal CH_VAL_I and the flash read data strobe signal DQS_r to the memory controller 100 via the physical channel 500. The control signals such as the signal CH_VAL_O, the signal CH_VAL_I, the signal Enc_CEb, the toggle signal Tog_CEb, the command latch enable signal CLE, the address latch enable signal ALE, the write enable signal WE, the read enable signal REb, the flash write data strobe signal DQS_w, and the flash read data strobe signal DQS_r are described above, and thus redundant descriptions thereof may be omitted herein.

The TDM interface 310A outputs the control signals with respect to a plurality of virtual channels based on TDM interfacing. For example, the TDM interface 310A outputs the control signals, namely, the toggle signal CEb, the command latch enable signal CLE, the address latch enable signal ALE, the write enable signal WE, the read enable signal REb, and the flash read data strobe signal DQS with respect to the virtual channels based on TDM interfacing.

A SERDES interface 320A inputs or outputs the data DQ_CH[7:0] via the input/output ports connected to the memory controller 100 via the physical channel 500 based on SERDES interfacing. For example, the SERDES interface 320A inputs or outputs the data DQ_CH[7:0] via input/output ports connected to the NVM chip 210 connected to each of the virtual channels based on SERDES interfacing.

As described above, communication is performed between the memory controller 100 and the memory device 200, which includes the NVM chip 200, based on interfacing using both a TDM communication process and a SERDES communication process. As a result, a plurality of virtual channels may be provided while a single physical channel is maintained, which may produce performance similar to using multiple channels by using I/O channels of the single physical channel. The number of NVM chips 210 that may be controlled using the memory controller 100 may vary.

Figure 15:
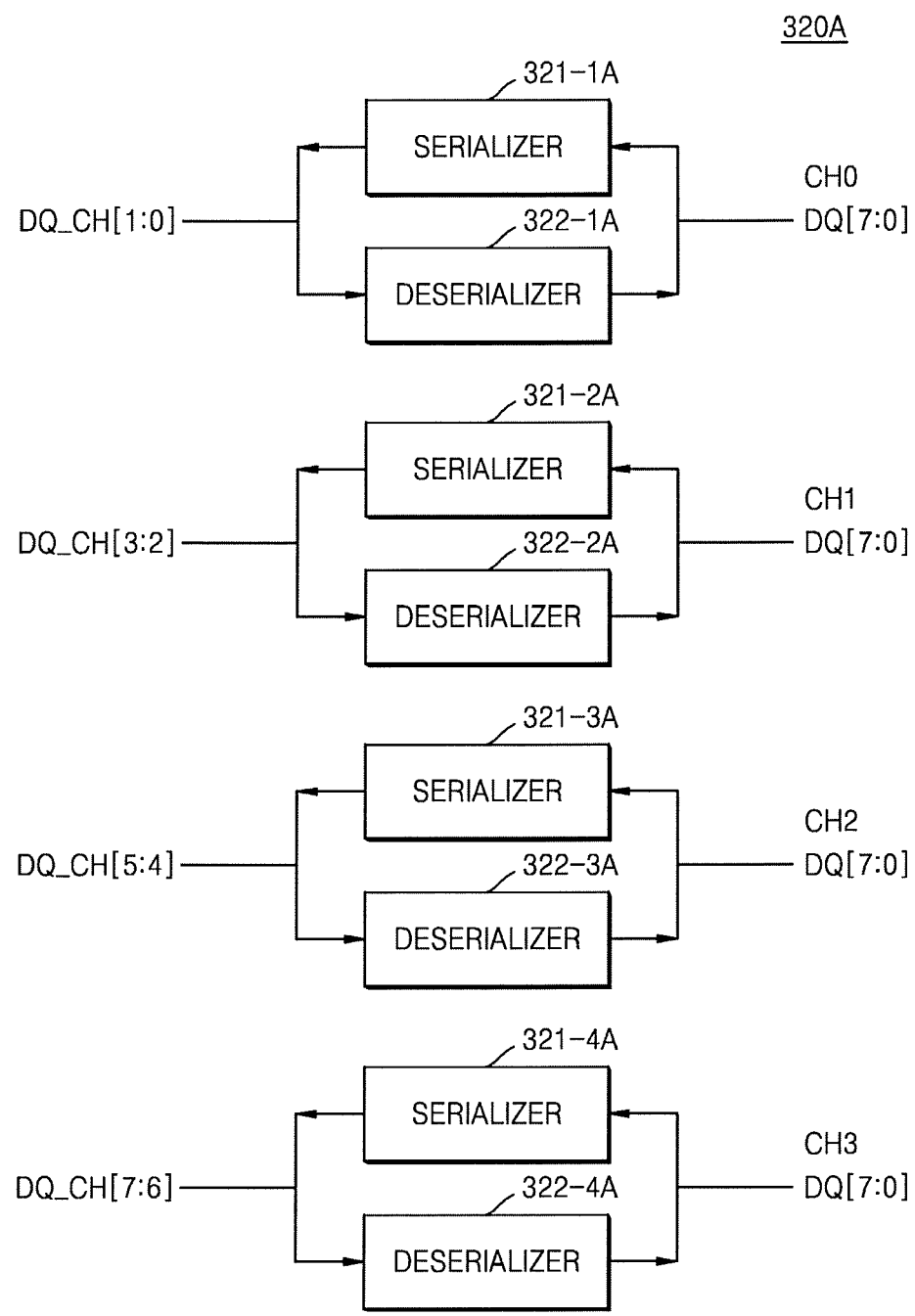
FIG. 15 is a block diagram of an example of a SERDES interface of FIGS. 1 and 2 according to an exemplary embodiment of the inventive concept.

FIG. 15 is a block diagram of a SERDES interface 320A as an example of the SERDES interface 320 of FIGS. 1 and 2 according to an exemplary embodiment of the inventive concept.

FIG. 15 shows an example of assigning 2 bits to DQ_CH[7:0] to transmit data with respect to each of 4 virtual channels when the 4 virtual channels are included in a single physical channel.

For example, 2 bits of DQ_CH[1:0] may be assigned to data transmission with respect to a virtual channel CH0, 2 bits of DQ_CH[3:2] may be assigned to data transmission with respect to a virtual channel CH1, 2 bits of DQ_CH[5:4] may be assigned to data transmission with respect to a virtual channel CH2, and 2 bits of DQ_CH[7:6] may be assigned to data transmission with respect to a virtual channel CH3.

A serializer 321-1A receives parallel data DQ[7:0] via the virtual channel CH0, outputs DQ_CH[1] by converting parallel data DQ[7:4] into serial data, and outputs DQ_CH[0] by converting parallel data DQ[3:0] into serial data. A deserializer 322-1A receives serial data DQ_CH[1] and DQ_CH[0] via the physical channel, outputs the parallel data DQ[7:4] with respect to the virtual channel CH0 by converting the serial data DQ_CH[1] into parallel data, and outputs the parallel data DQ[3:0] by converting the serial data DQ_CH[0] into parallel data.

A serializer 321-2A receives the parallel data DQ[7:0] via the virtual channel CH1, outputs DQ_CH[3] by converting the parallel data DQ[7:4] into serial data, and outputs DQ_CH[2] by converting the parallel data DQ[3:0] into serial data. A deserializer 322-2A receives the serial data DQ_CH[3] and DQ_CH[2] via the physical channel, outputs the parallel data DQ[7:4] with respect to the virtual channel CH1 by converting the serial data DQ_CH[3] into parallel data, and outputs the parallel data DQ[3:0] with respect to the virtual channel CH1 by converting the serial data DQ_CH[2] into parallel data.

A serializer 321-3A receives the parallel data DQ[7:0] via the virtual channel CH2, outputs DQ_CH[5] by converting the parallel data DQ[7:4] into serial data, and outputs DQ_CH[4] by converting the parallel data DQ[3:0] into serial data. A deserializer 322-3A receives the serial data DQ_CH[5] and DQ_CH[4] via the physical channel, outputs the parallel data DQ[7:4] with respect to the virtual channel CH2 by converting the serial data DQ_CH[5] into parallel data, and outputs the parallel data DQ[3:0] with respect to the virtual channel CH2 by converting the serial data DQ_CH[4] into parallel data.

A serializer 321-4A receives the parallel data DQ[7:0] via the virtual channel CH3, outputs DQ_CH[7] by converting the parallel data DQ[7:4] into serial data, and outputs DQ_CH[6] by converting the parallel data DQ[3:0] into serial data. A deserializer 322-4A receives the serial data DQ_CH[7] and DQ_CH[6] via the physical channel, outputs the parallel data DQ[7:4] with respect to the virtual channel CH3 by converting the serial data DQ_CH[7] into parallel data, and outputs the parallel data DQ[3:0] with respect to the virtual channel CH3 by converting the serial data DQ_CH[6] into parallel data.

Figure 16:
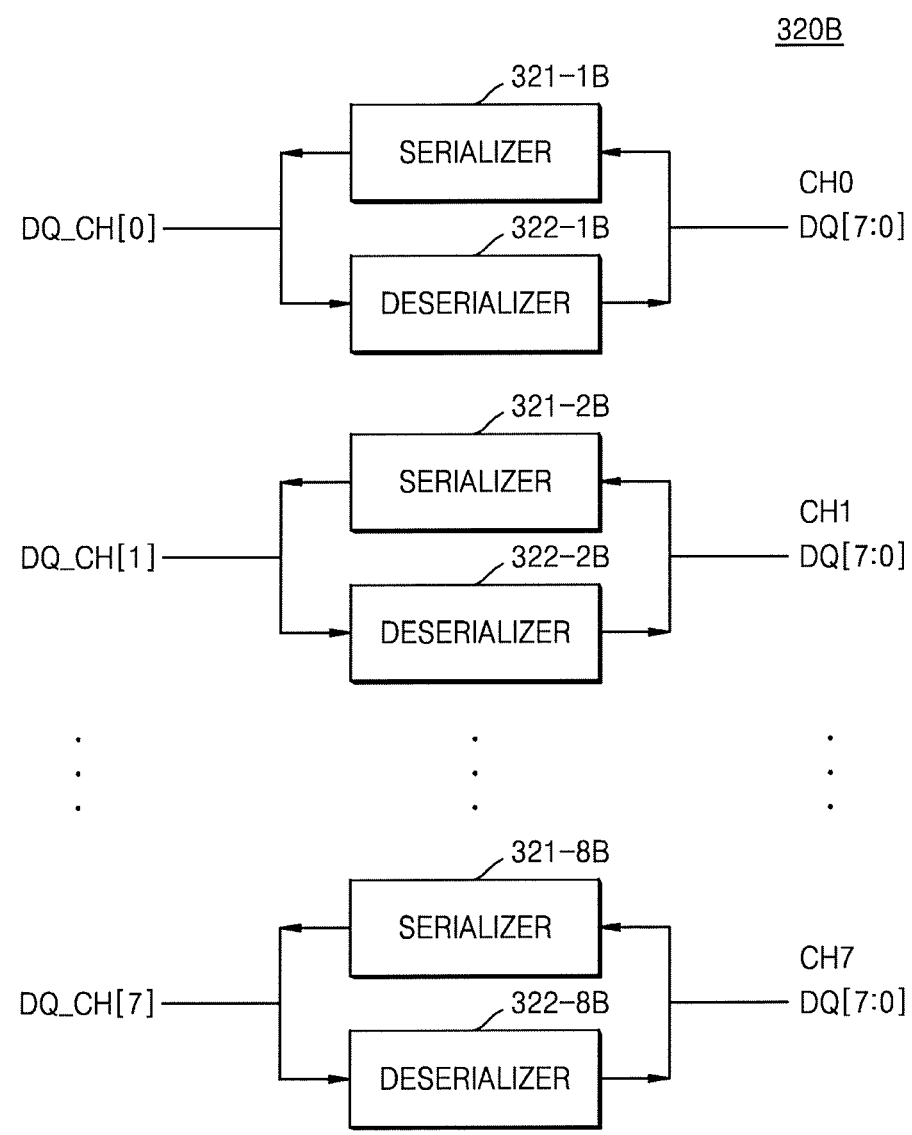
FIG. 16 is a block diagram of an example of a SERDES interface of FIGS. 1 and 2 according to an exemplary embodiment of the inventive concept.

FIG. 16 is a block diagram of a SERDES interface 320B as an example of the SERDES interface 320 of FIGS. 1 and 2 according to an exemplary embodiment of the inventive concept.

FIG. 16 shows an example of assigning 1 bit to DQ_CH [7:0] to transmit data with respect to each of 8 virtual channels when the 8 virtual channels are included in a single physical channel. For example, 1 bit of DQ_CH[0] may be assigned to transmit data with respect to the virtual channel CH0, and each of DQ_CH[1]~DQ_CH[7] may be assigned to transmit data with respect to the virtual channels CH1~CH7.

A serializer 321-1B receives parallel data DQ[7:0] via the virtual channel CH0 and outputs DQ_CH[0] by converting the parallel data DQ[7:0] into serial data. A deserializer 322-1B receives serial data DQ_CH[0] via the physical channel and outputs the parallel data DQ[7:0] with respect to the virtual channel CH0 by converting the serial data DQ_CH[0] into parallel data.

A serializer 321-2B receives parallel data DQ[7:0] via the virtual channel CH1 and outputs DQ_CH[1] by converting the parallel data DQ[7:0] into serial data. A deserializer 322-2B receives serial data DQ_CH[1] via the physical channel and outputs the parallel data DQ[7:0] with respect to the virtual channel CH1 by converting the serial data DQ_CH[1] into parallel data.

In the same manner, a serializer 321-8B receives parallel data DQ[7:0] via the virtual channel CH7 and outputs DQ_CH[7] by converting the parallel data DQ[7:0] into serial data. A deserializer 322-8B receives serial data DQ_CH[7] via the physical channel and outputs the parallel data DQ[7:0] with respect to the virtual channel CH7 by converting the serial data DQ_CH[7] into parallel data.

Figure 17:
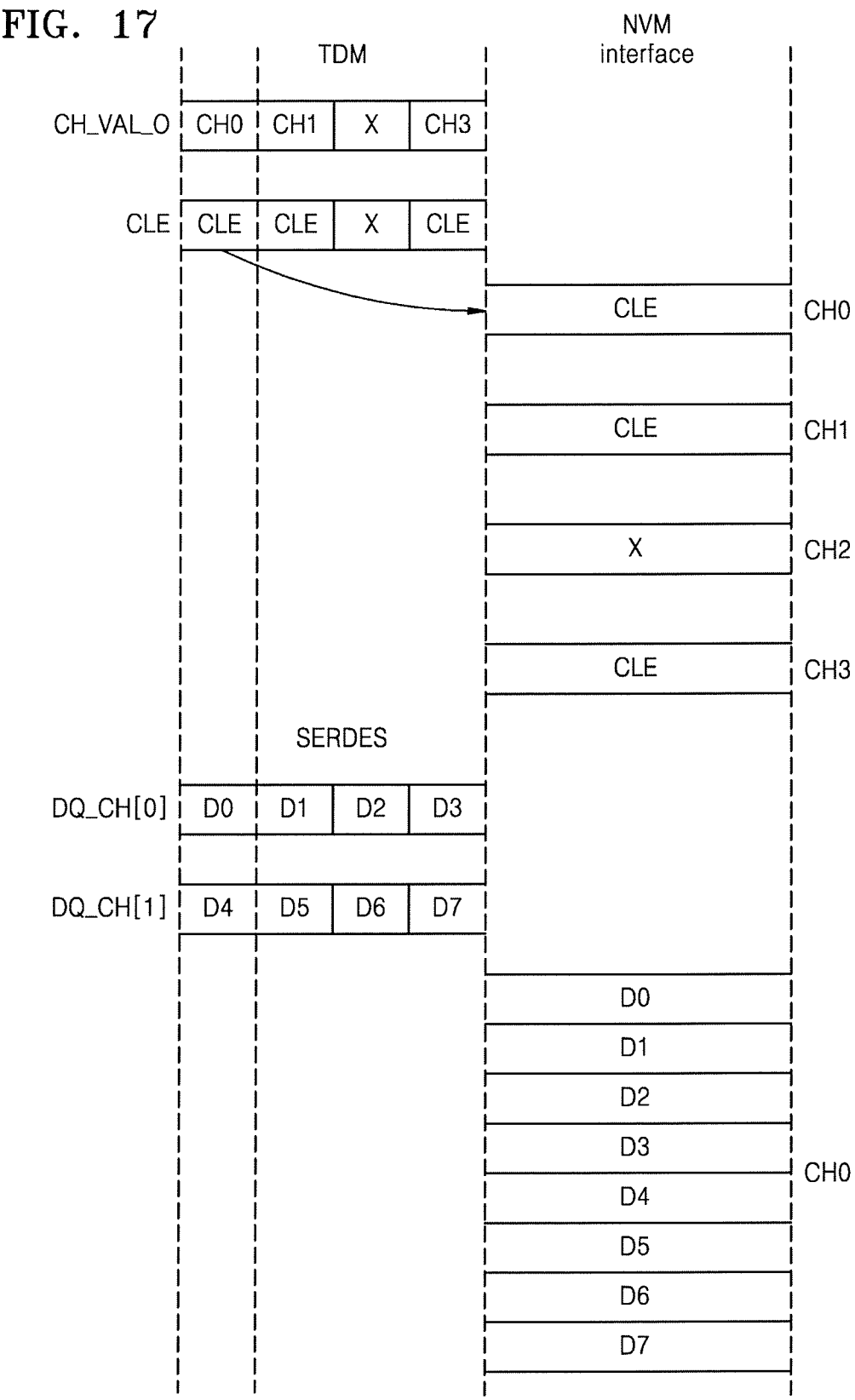
FIG. 17 is a conceptual diagram illustrating interfacing when a single physical channel is expanded to 4 virtual channels in an interfacing device according to an exemplary embodiment of the inventive concept.

FIG. 17 is a conceptual diagram illustrating interfacing when a single physical channel is expanded to the 4 virtual channels CH0~CH3 in an interfacing device according to an exemplary embodiment of the inventive concept.

FIG. 17 shows a case of generating the control signal CLE with respect to each of the 4 virtual channels CH0~CH3 based on TDM interfacing with respect to the control signals CH_VAL_O and CLE.

The memory controller 100 performs TDM on the control signal CH_VAL_O indicating a selected virtual channel number, and outputs a signal for a virtual channel number selection to each of the 4 virtual channels CH0~CH3 corresponding to the physical channel in a single frame unit to the TDM interface 310. Referring to FIG. 17, a section CH0~CH3 forms a single frame in TDM. For example, the memory controller 100 may output a TDM-multiplexed control signal to the TDM interface 310 at 800 MHz/1.6 Gbps.

In the same manner, the memory controller 100 performs TDM on the control signal CLE and outputs the control signal CLE with respect to the 4 virtual channels CH0~CH3 corresponding to the physical channel in the single frame unit to the TDM interface 310.

The TDM interface 310 outputs the control signal CLE that matches for selected virtual channels in the TDM-multiplexed CH_VAL_O as the control signal CLE with respect to each of the 4 virtual channels CH0~CH3. For example, the TDM interface 310 may output the control signal CLE at 200 MHz/400 Mbps with respect to each of the 4 virtual channels CH0~CH3 to the NVM chip 210 connected to its corresponding virtual channel.

Referring to FIG. 17, the virtual channel CH2 is not selected and the other virtual channels CH0, CH1, and CH3 are selected by the TDM-multiplexed control signal CH_VAL_O. Thus, the control signal CLE corresponding to each of the virtual channels CH0~CH3 is output to each virtual channel.

FIG. 17 shows an example of assigning 2 bits to transmit data with respect to each of the virtual channels CH0~CH3 in DQ_CH[7:0] when the 4 virtual channels CH0~CH3 are included in the single physical channel.

Assuming that 2 bits of DQ_CH[1:0] are assigned to transmit data with respect to the virtual channel CH0, DQ[3:0] is output with respect to the virtual channel CH0 by converting D0~D3 of the serial data DQ_CH[0] into parallel data, and DQ[7:4] is output with respect to the virtual channel CH0 by converting D4~D7 of the serial data DQ_CH[1] into parallel data.

In the same manner, DQ[3:0] may be generated with respect to each of the virtual channels CH1, CH2, and CH3 from DQ_CH[3:2], DQ_CH[5:4], and DQ_CH[7:5].

The parallel data DQ[7:0] is output via the virtual channel CH0, serial data DQ_CH[1] is output by converting the parallel data DQ[7:4] into serial data D7~D4, and the serial data DQ_CH[0] is output by converting the parallel data DQ_CH[3:0] into serial data D3~D0.

In the same manner, DQ_CH[3:2], DQ_CH[5:4], and DQ_CH[7:5] may be generated from DQ[7:0] with respect to each of the virtual channels CH1, CH2, and CH3.

Figure 18:
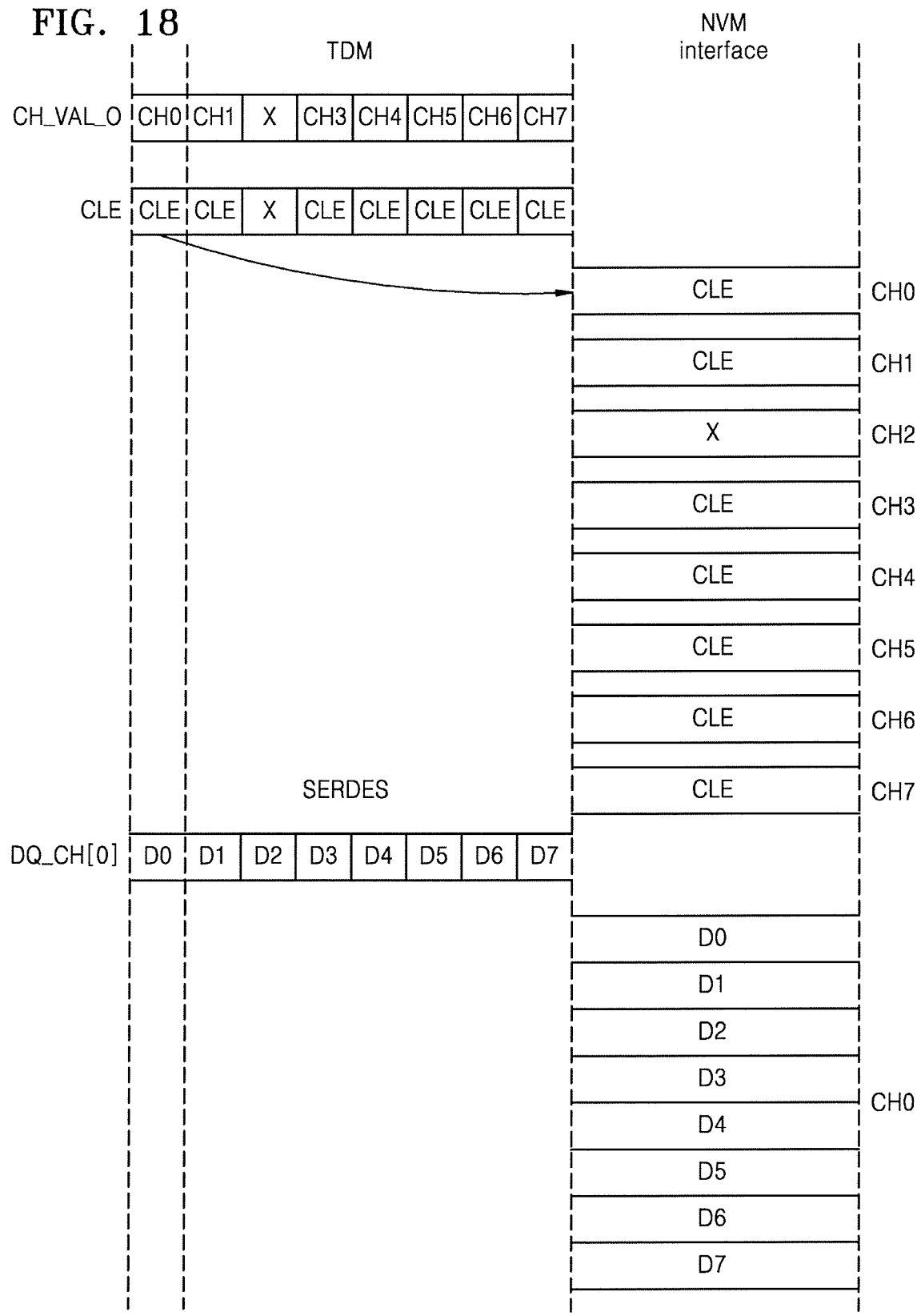
FIG. 18 is a conceptual diagram illustrating interfacing when a single physical channel is expanded to 8 virtual channels in an interfacing device according to an exemplary embodiment of the inventive concept.

FIG. 18 is a conceptual diagram illustrating interfacing when a single physical channel is expanded to the 8 virtual channels CH0~CH7 in an interfacing device according to an exemplary embodiment of the inventive concept.

The memory controller 100 performs TDM on the control signal CH_VAL_O indicating a selected virtual channel number, and outputs a signal for a virtual channel number selection to each of the 8 virtual channels CH0~CH7 corresponding to the physical channel in a single frame unit to the TDM interface 310. For example, the memory controller 100 may output a TDM-multiplexed control signal to the TDM interface 310 at 1.6 GMHz/3.2 Gbps.

In the same manner, the memory controller 100 performs TDM on the control signal CLE and outputs the control signal CLE to each of the 8 virtual channels CH0~CH7 corresponding to the physical channel in the single frame unit to the TDM interface 310.

The TDM interface 310 outputs the control signal CLE that matches for selected virtual channels in the TDM-multiplexed CH_VAL_O as the control signal CLE with respect to each of the 8 virtual channels CH0~CH7. For example, the TDM interface 310 may output the control signal CLE at 200 MHz/400 Mbps with respect to each of the 8 virtual channels CH0~CH7 to the NVM chip 210.

Referring to FIG. 18, the virtual channel CH2 is not selected and the other virtual channels CH0, CH1, and CH3~CH7 are selected by the TDM-multiplexed control signal CH_VAL_O. Thus, the control signal CLE corresponding to each of the virtual channels CH0, CH1, and CH3~CH7 is output to each virtual channel.

FIG. 18 shows an example of assigning 1 bit to transmit data with respect to each of the 8 virtual channels CH0~CH7 in DQ_CH[7:0] when the 8 virtual channels CH0~CH7 are included in the single physical channel.

Assuming that 2 bits of DQ_CH[0] are assigned to transmit data with respect to the virtual channel CH0, DQ[7:0] is output with respect to the virtual channel CH0 by converting D0~D7 of the serial data DQ_CH[0] into parallel data. In the same manner, DQ[7:0] may be generated with respect to each of the virtual channels CH1~CH7 from DQ_CH[1], DQ_CH[2], DQ_CH[3], DQ_CH[4], DQ_CH[5], DQ_CH[6], and DQ_CH[7].

The parallel data DQ[7:0] is input via the virtual channel CH0, and DQ_CH[0] is output by converting the parallel data DQ[7:0] into serial data D7~D0. In the same manner, DQ_CH[1]~DQ_CH[7] may be generated from DQ[7:0] with respect to each of the virtual channels CH1~CH7.

An interfacing operation of the interfacing device 300 that is performed in the memory system 1000 or 2000 of FIG. 1 or 2 will now be described with reference to a timing diagram of signals described above with reference to FIGS. 19 through 28.

For convenience of description, FIGS. 19 through 28 show interfacing examples when the 4 virtual channels 600 CH0~CH3 correspond to the single physical channel 500, and DQ_CH and DQ are set as 8 bits.

Figure 19:
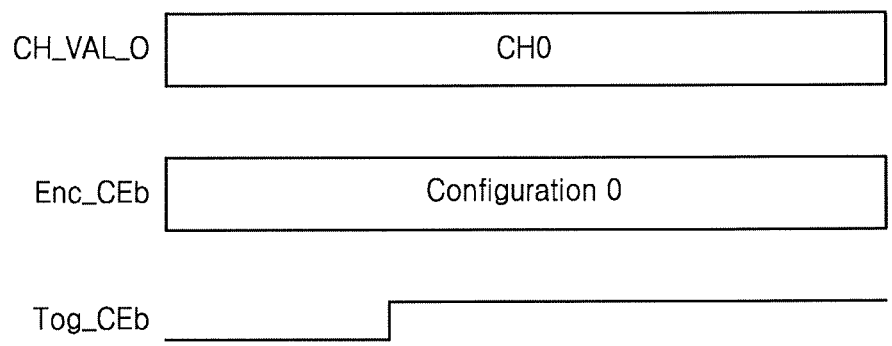
FIG. 19 is a timing diagram of signals for configuration selection operation between a memory controller and an interfacing device in memory systems according to an exemplary embodiment of the inventive concept.

FIG. 19 is a timing diagram of signals for a configuration selection operation between the memory controller 100 and the interfacing device 300 in the memory systems 1000 and 2000 according to an exemplary embodiment of the inventive concept.

Figure 20:
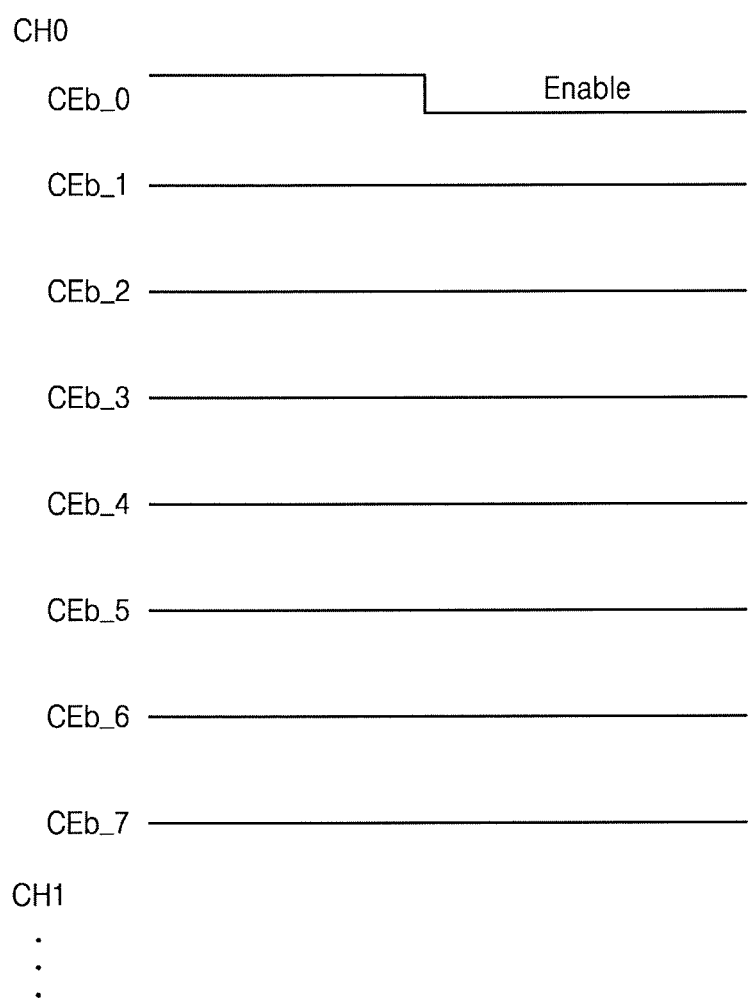
FIG. 20 is a timing diagram of signals for a configuration selection operation between an interfacing device and a memory device in memory systems according to an exemplary embodiment of the inventive concept.

FIG. 20 is a timing diagram of signals for a configuration selection operation between the interfacing device 300 and the memory device 200 in the memory systems 1000 and 2000 according to an exemplary embodiment of the inventive concept.

The memory controller 100 for selecting the virtual channels generates and outputs a signal CH_VAL_O with respect to channel information, a signal Enc_CEb with respect to encoded chip enable information, and a signal Tog_CEb indicating a timing when a corresponding chip number is enabled and disabled to the interfacing device 300. For example, the signal CH_VAL_O for selecting the virtual channel CH0 and the signal Enc_CEb for enabling a chip with respect to Configuration 0 are input to the interfacing device 300 in FIG. 19.

If the signals CH_VAL_O, Enc_CEb, and Tog_CEb are input as shown in FIG. 19, the interfacing device 300 outputs a chip enable signal CEb_0 with respect to Configuration 0 of the virtual channel CH0 to have a logic state for enabling the chip in accordance with toggle timing of the signal Tog_CEb, as shown in FIG. 20. The interfacing device 300 outputs chip enable signals CEb_1~CEb_7, respectively, with respect to Configuration 1~Configuration 7 of the virtual channel CH0 to have a logic state in which a disable state is maintained.

An operation of selecting a Configuration with respect to other virtual channels may be performed in the same manner as described with respect to the virtual channel CH0 above.

Figure 21:
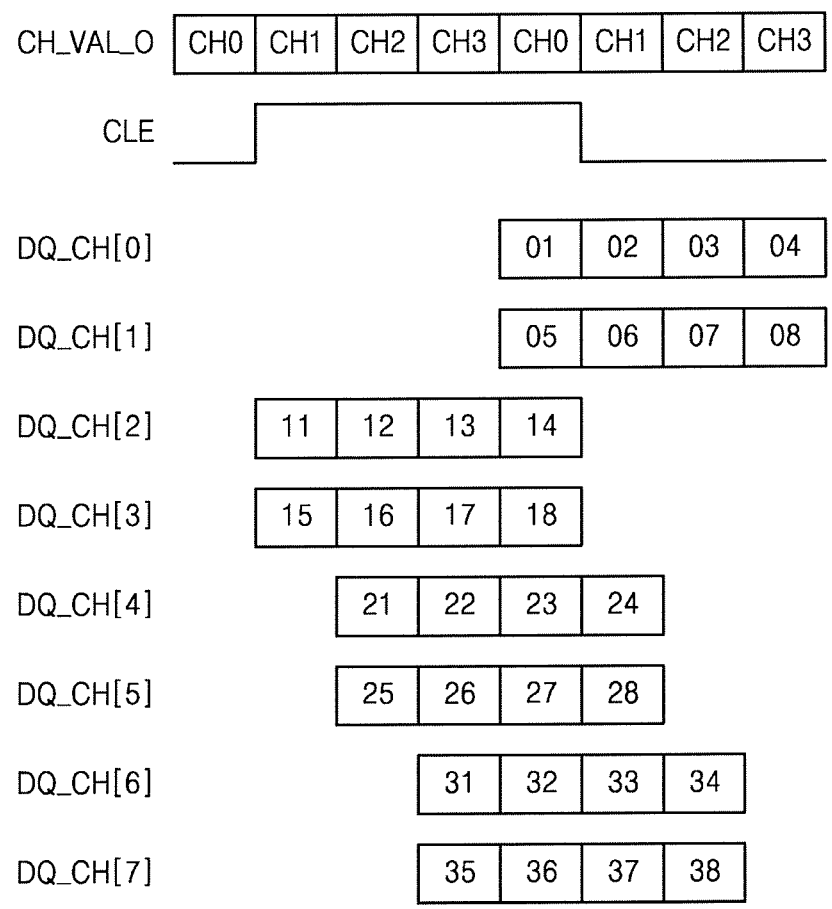
FIG. 21 is a timing diagram of signals relating to command information transmission between a memory controller and an interfacing device in memory systems according to an exemplary embodiment of the inventive concept.

FIG. 21 is a timing diagram of signals relating to command information transmission between the memory controller 100 and the interfacing device 300 in the memory systems 1000 and 2000 according to an exemplary embodiment of the inventive concept.

Figure 22:
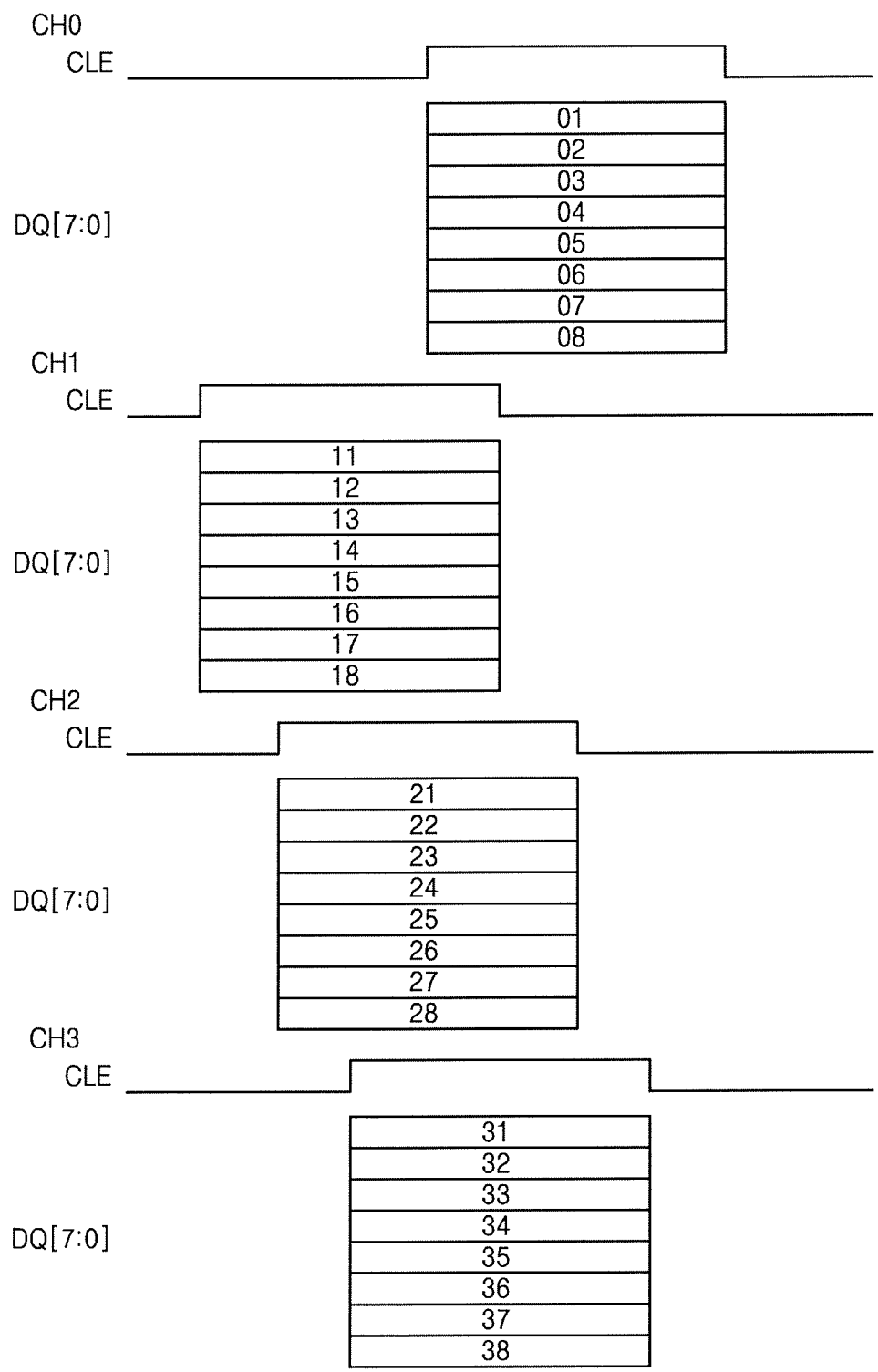
FIG. 22 is a timing diagram of signals relating to command information transmission between an interfacing device and a memory device in memory systems according to an exemplary embodiment of the inventive concept.

FIG. 22 is a timing diagram of signals relating to command information transmission between the interfacing device 300 and the memory device 200 in the memory systems 1000 and 2000 according to an exemplary embodiment of the inventive concept.

The interfacing device 300 for generating the command latch enable signal CLE and command information with respect to each of virtual channels receives the signal CH_VAL_O with respect to channel information, the command latch enable signal CLE with respect to each of the virtual channels, and DQ_CH[0]~DQ_CH[7] including the command information regarding the virtual channels from the memory controller 100.

The numbers 01~08, 11~18, 21~28, and 31~38 indicated in DQCH[0] DQ_CH[7] and DQ[7:0] in FIGS. 21 through 28 are numbers for convenience of description and refer to bit information. For example, "01" refers to information regarding 1 bit. Thus, 01~08 refer to 8-bit information.

Referring to FIG. 21, DQ_CH[1:0] includes the command information 01~08 regarding the virtual channel CH0, DQ_CH[3:2] includes the command information 11~18 regarding the virtual channel CH1, DQ_CH[5:4] includes the command information 21~28 regarding the virtual channel CH2, and DQ_CH[7:6] includes the command information 31~38 regarding the virtual channel CH3.

If CH_VAL_O, CLE, and DQ_CH[0]~DQ_CH[7] are input, the interfacing device 300 generates the command latch enable signal CLE and DQ[7:0] indicating the command information with respect to each of the virtual channels CH0~CH3, as shown in FIG. 21.

As shown in FIGS. 21 and 22, the interfacing device 300 generates the command latch enable signal CLE with respect to each of the virtual channels based on the command latch enable signal CLE corresponding to the virtual channel selected by CH_VAL_O.

The interfacing device 300 outputs DQ[3:0] with respect to the virtual channel CH0 by selecting the virtual channel CH0 through CH_VAL_O and converting 01~04 of the serial data DQ_CH[0] that is input from a section in which the command latch enable signal CLE is in a "HIGH" state into parallel data, and outputs DQ[7:4] with respect to the virtual channel CH0 by converting 05~08 of the serial data DQ_CH[1] into parallel data. Thus, DQ[7:0] with respect to the virtual channel CH[0] is 01~08.

The interfacing device 300 outputs DQ[3:0] with respect to the virtual channel CH1 by selecting the virtual channel CH1 through CH_VAL_O and converting 11~14 of the serial data DQ_CH[2] that is input from a section in which the command latch enable signal CLE is in a "HIGH" state into parallel data, and outputs DQ[7:4] with respect to the virtual channel CH1 by converting 15~18 of the serial data DQ_CH[3] into parallel data. Thus, DQ[7:0] with respect to the virtual channel CH[1] is 11~18.

The interfacing device 300 outputs DQ[3:0] with respect to the virtual channel CH2 by selecting the virtual channel CH2 through CH_VAL_O and converting 21~24 of the serial data DQ_CH[4] that is input from a section in which the command latch enable signal CLE is in a "HIGH" state into parallel data, and outputs DQ[7:4] with respect to the virtual channel CH2 by converting 25~28 of the serial data DQ_CH[5] into parallel data. Thus, DQ[7:0] with respect to the virtual channel CH[2] is 21~28.

The interfacing device 300 outputs DQ[3:0] with respect to the virtual channel CH3 by selecting the virtual channel CH3 through CH_VAL_O and converting 31~34 of the serial data DQ_CH[6] that is input from a section in which the command latch enable signal CLE is in a "HIGH" state into parallel data, and outputs DQ[7:4] with respect to the virtual channel CH3 by converting 35~38 of the serial data DQ_CH[7] into parallel data. Thus, DQ[7:0] with respect to the virtual channel CH[3] is 31~38.

Figure 23:
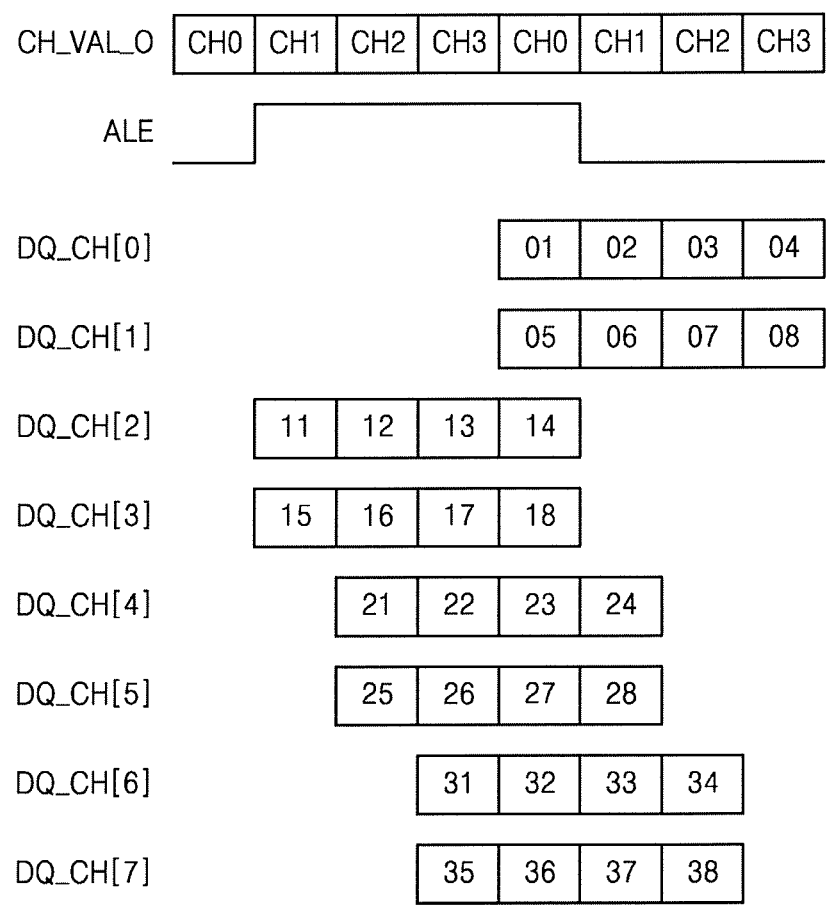
FIG. 23 is a timing diagram of signals relating to address information transmission between a memory controller and an interfacing device in memory systems according to an exemplary embodiment of the inventive concept.

FIG. 23 is a timing diagram of signals relating to address information transmission between the memory controller 100 and the interfacing device 300 in the memory systems 1000 and 2000 according to an exemplary embodiment of the inventive concept.

Figure 24:
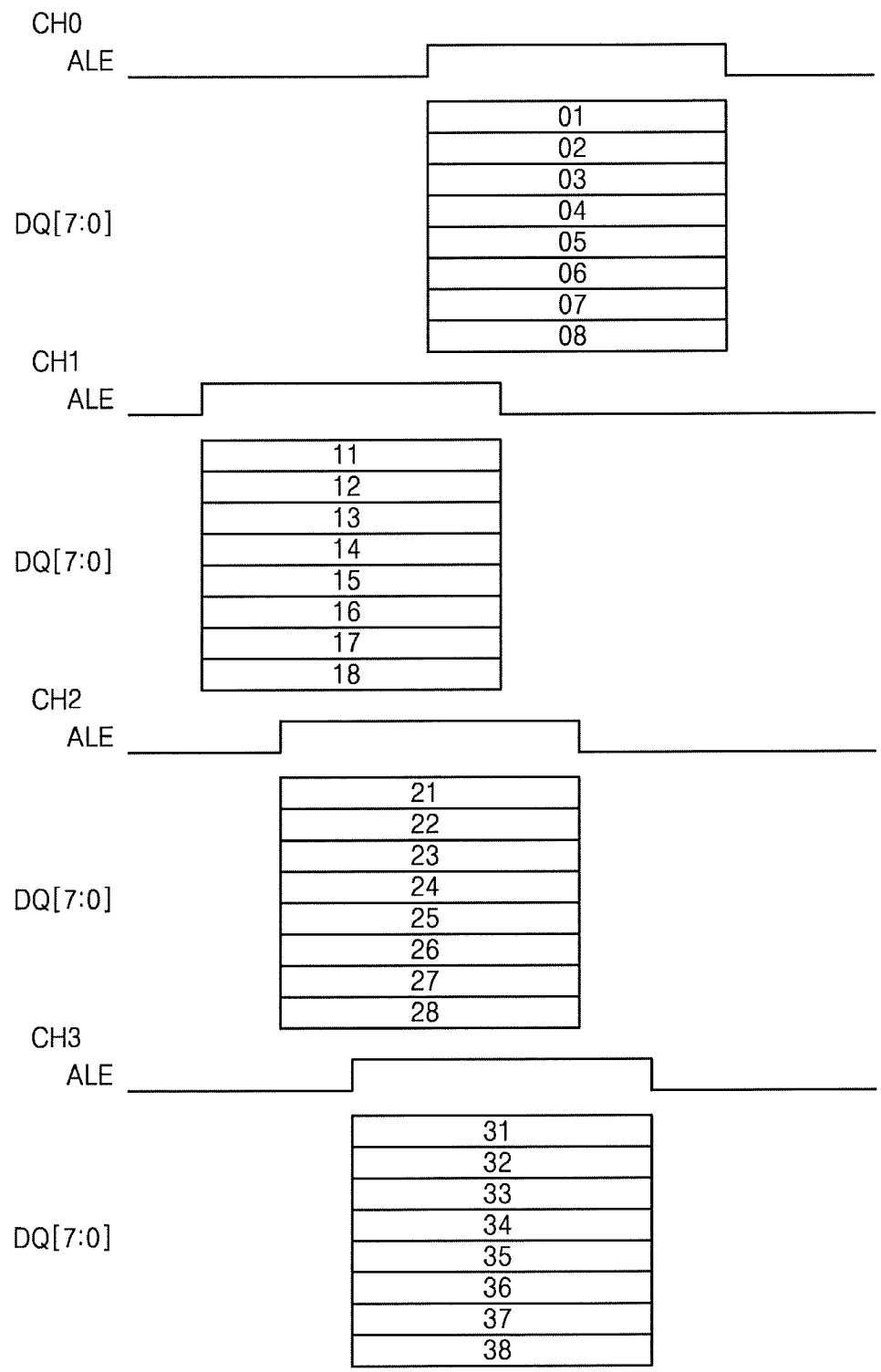
FIG. 24 is a timing diagram of signals relating to address information transmission between an interfacing device and a memory device in memory systems according to an exemplary embodiment of the inventive concept.

FIG. 24 is a timing diagram of signals relating to address information transmission between the interfacing device 300 and the memory device 200 in the memory systems 1000 and 2000 according to an exemplary embodiment of the inventive concept.

The interfacing device 300 for generating an address latch enable signal ALE and address information with respect to each of virtual channels receives the signal CH_VAL_O with respect to channel information, the address latch enable signal ALE with respect to each of the virtual channels, and DQ_CH[0]~DQ_CH[7] including the address information regarding the virtual channels from the memory controller 100.

Referring to FIG. 23, DQ_CH[1:0] includes the address information 01~08 regarding the virtual channel CH0, DQ_CH[3:2] includes the address information 11~18 regarding the virtual channel CH1, DQ_CH[5:4] includes the address information 21~28 regarding the virtual channel CH2, and DQ_CH[7:6] includes the address information 31~38 regarding the virtual channel CH3.

If CH_VAL_O, ALE, and DQ_CH[0]~DQ_CH[7] are input, the interfacing device 300 generates DQ[7:0] indicating the address latch enable signal ALE and the address information with respect to each of the virtual channels CH0~CH3, as shown in FIG. 24.

As shown in FIGS. 23 and 24, the interfacing device 300 generates the address latch enable signal ALE with respect to each of the virtual channels based on the address latch enable signal ALE corresponding to the virtual channel selected by CH_VAL_O.

The interfacing device 300 outputs DQ[3:0] with respect to the virtual channel CH0 by selecting the virtual channel CH0 through CH_VAL_Ond converting 01~04 of the serial data DQ_CH[0] that is input from a section in which the address latch enable signal ALE is in a "HIGH" state into parallel data, and outputs DQ[7:4] with respect to the virtual channel CH0 by converting 05~08 of the serial data DQ_CH[1] into parallel data. Thus, DQ[7:0] with respect to the virtual channel CH[0] is 01~08.

The interfacing device 300 outputs DQ[3:0] with respect to the virtual channel CH1 by selecting the virtual channel CH1 through CH_VAL_O and converting 11~14 of the serial data DQ_CH[2] that is input from a section in which the address latch enable signal ALE is in a "HIGH" state into parallel data, and outputs DQ[7:4] with respect to the virtual channel CH1 by converting 15~18 of the serial data DQ_CH[3] into parallel data. Thus, DQ[7:0] with respect to the virtual channel CH[1] is 11~18.

The interfacing device 300 outputs DQ[3:0] with respect to the virtual channel CH2 by selecting the virtual channel CH2 through CH_VAL_O and converting 21~24 of the serial data DQ_CH[4] that is input from a section in which the address latch enable signal ALE is in a "HIGH" state into parallel data, and outputs DQ[7:4] with respect to the virtual channel CH2 by converting 25~28 of the serial data DQ_CH[5] into parallel data. Thus, DQ[7:0] with respect to the virtual channel CH[2] is 21~28.

The interfacing device 300 outputs DQ[3:0] with respect to the virtual channel CH3 by selecting the virtual channel CH3 through CH_VAL_O and converting 31~34 of the serial data DQ_CH[6] that is input from a section in which the address latch enable signal ALE is in a "HIGH" state into parallel data, and outputs DQ[7:4] with respect to the virtual channel CH3 by converting 35~38 of the serial data DQ_CH[7] into parallel data. Thus, DQ[7:0] with respect to the virtual channel CH[3] is 31~38.

FIG. 25 is a timing diagram of signals relating to data transmission according to a write operation between the memory controller 100 and the interfacing device 300 in the memory systems 1000 and 2000 of FIGS. 1 and 2 according to an exemplary embodiment of the inventive concept.

Figure 26:
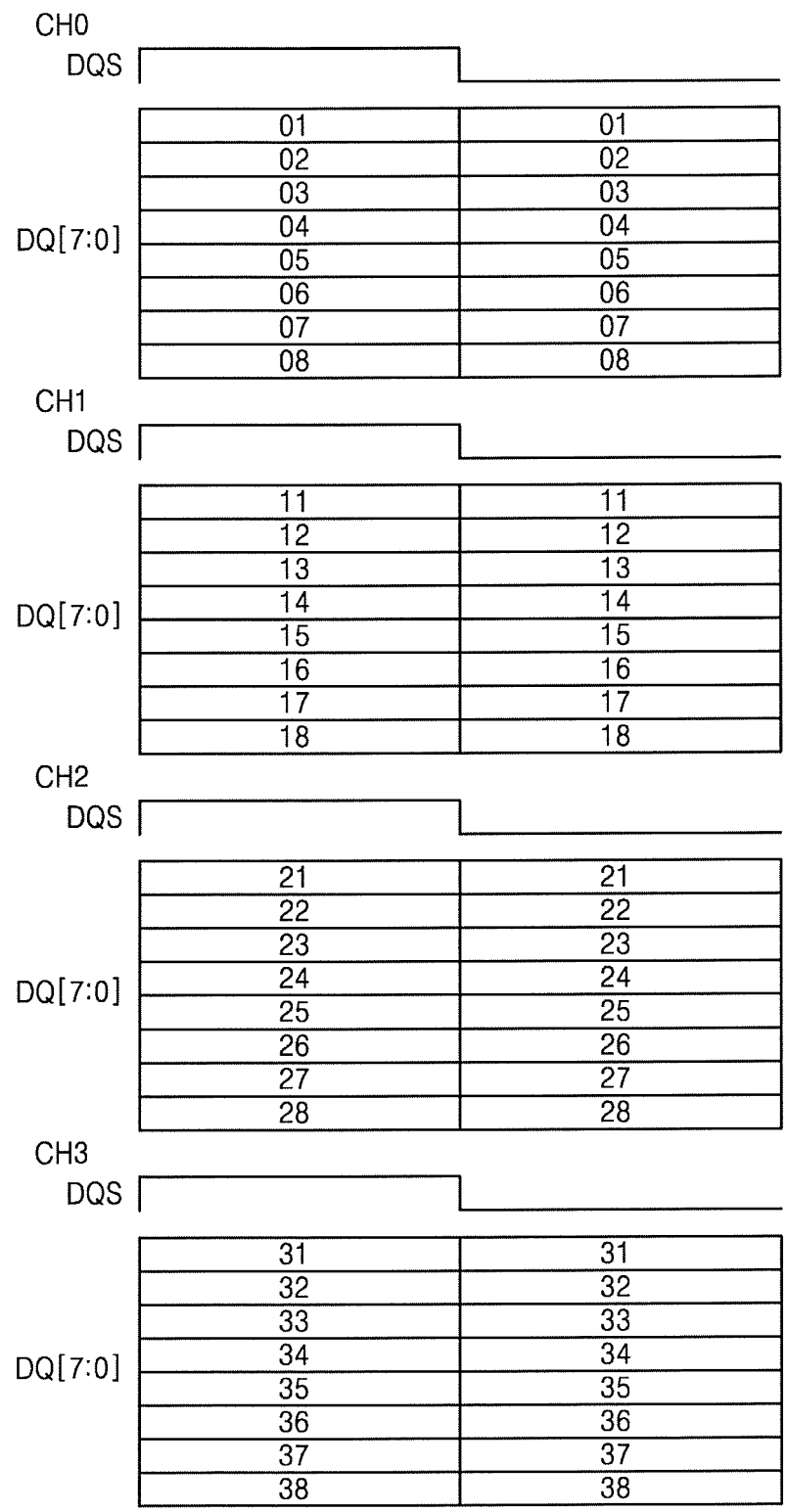
FIG. 26 is a timing diagram of signals relating to data transmission according to a write operation between an interfacing device and a memory device in memory systems according to an exemplary embodiment of the inventive concept.

FIG. 26 is a timing diagram of signals relating to data transmission according to a write operation between the interfacing device 300 and the memory device 200 in the memory systems 1000 and 2000 of FIGS. 1 and 2 according to an exemplary embodiment of the inventive concept.

The interfacing device 300 used for data transmission according to the write operation receives the signal CH_VAL_O with respect to channel information, the flash write data strobe signal DQS_w with respect to each of the virtual channels, and DQ_CH[0]~DQ_CH[7] including write data regarding the virtual channels from the memory controller 100.

As shown in FIGS. 25 and 26, the interfacing device 300 generates the data strobe signal DQS and the data DQ[7:0] with respect to each of the virtual channels based on the flash write data strobe signal DQS_w corresponding to the virtual channel selected by CH_VAL_O.

For example, the interfacing device 300 outputs DQ[3:0] with respect to the virtual channel CH0 by selecting the virtual channel CH0 through CH_VAL_O and converting 01~04 of the serial data DQ_CH[0] into parallel data by the flash write data strobe signal DQS_w, and outputs DQ[7:4] with respect to the virtual channel CH0 by converting 05~08 of the serial data DQ_CH[1] into parallel data. Thus, DQ[7:0] with respect to the virtual channel CH[0] is 01~08.

The interfacing device 300 outputs DQ[3:0] with respect to the virtual channel CH1 by selecting the virtual channel CH1 through CH_VAL_O and converting 11~14 of the serial data DQ_CH[2] into parallel data by the flash write data strobe signal DQS_w, and outputs DQ[7:4] with respect to the virtual channel CH1 by converting 15~18 of the serial data DQ_CH[3] into parallel data. Thus, DQ[7:0] with respect to the virtual channel CH[1] is 11~18.

The interfacing device 300 outputs DQ[3:0] with respect to the virtual channel CH2 by selecting the virtual channel CH2 through CH_VAL_O and converting 21~24 of the serial data DQ_CH[4] into parallel data by the flash write data strobe signal DQS_w, and outputs DQ[7:4] with respect to the virtual channel CH2 by converting 25~28 of the serial data DQ_CH[5] into parallel data. Thus, DQ[7:0] with respect to the virtual channel CH[2] is 21~28.

The interfacing device 300 outputs DQ[3:0] with respect to the virtual channel CH3 by selecting the virtual channel CH3 through CH_VAL_O and converting 31~34 of the serial data DQ_CH[6] into parallel data by the flash write data strobe signal DQS_w, and outputs DQ[7:4] with respect to the virtual channel CH3 by converting 35~38 of the serial data DQ_CH[7] into parallel data. Thus, DQ[7:0] with respect to the virtual channel CH[3] is 31~38.

Figure 27:
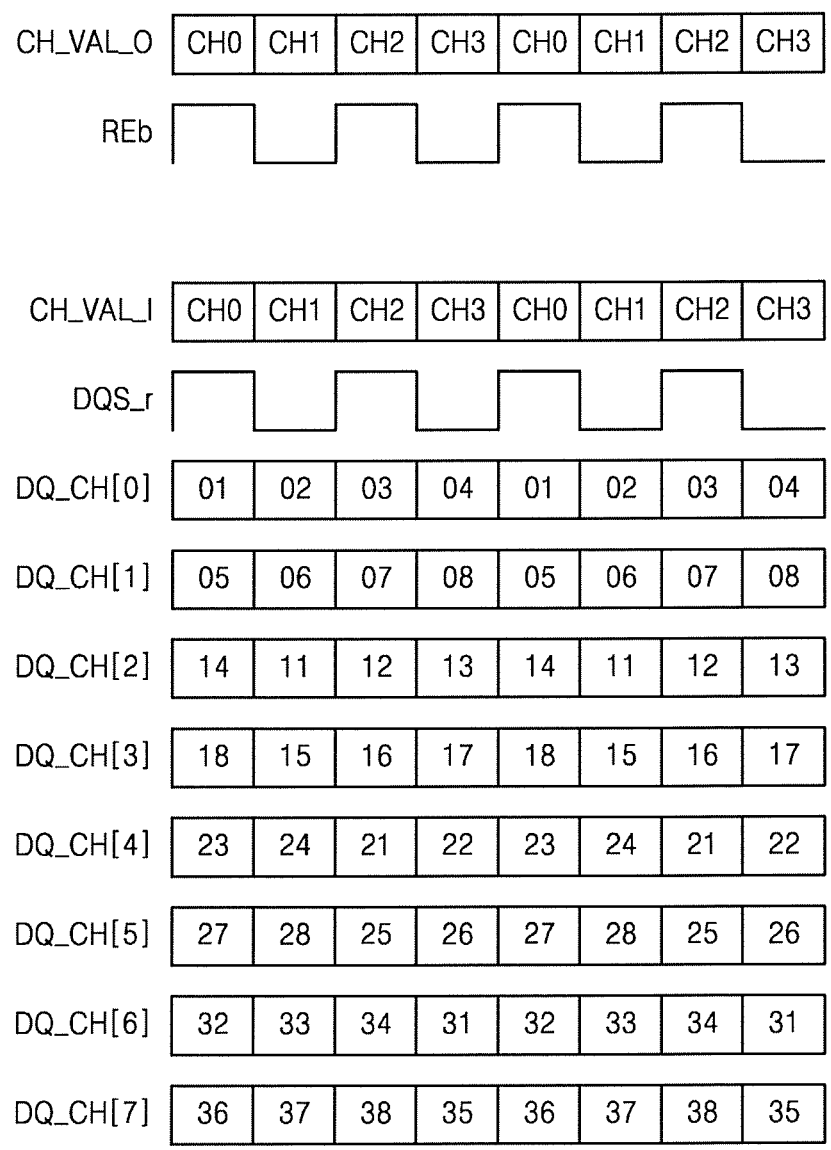
FIG. 27 is a timing diagram of signals relating to data transmission according to a read operation between a memory controller and an interfacing device in memory systems according to an exemplary embodiment of the inventive concept.

FIG. 27 is a timing diagram of signals relating to data transmission according to a read operation between the memory controller 100 and the interfacing device 300 in the memory systems 1000 and 2000 of FIGS. 1 and 2 according to an exemplary embodiment of the inventive concept.

Figure 28:
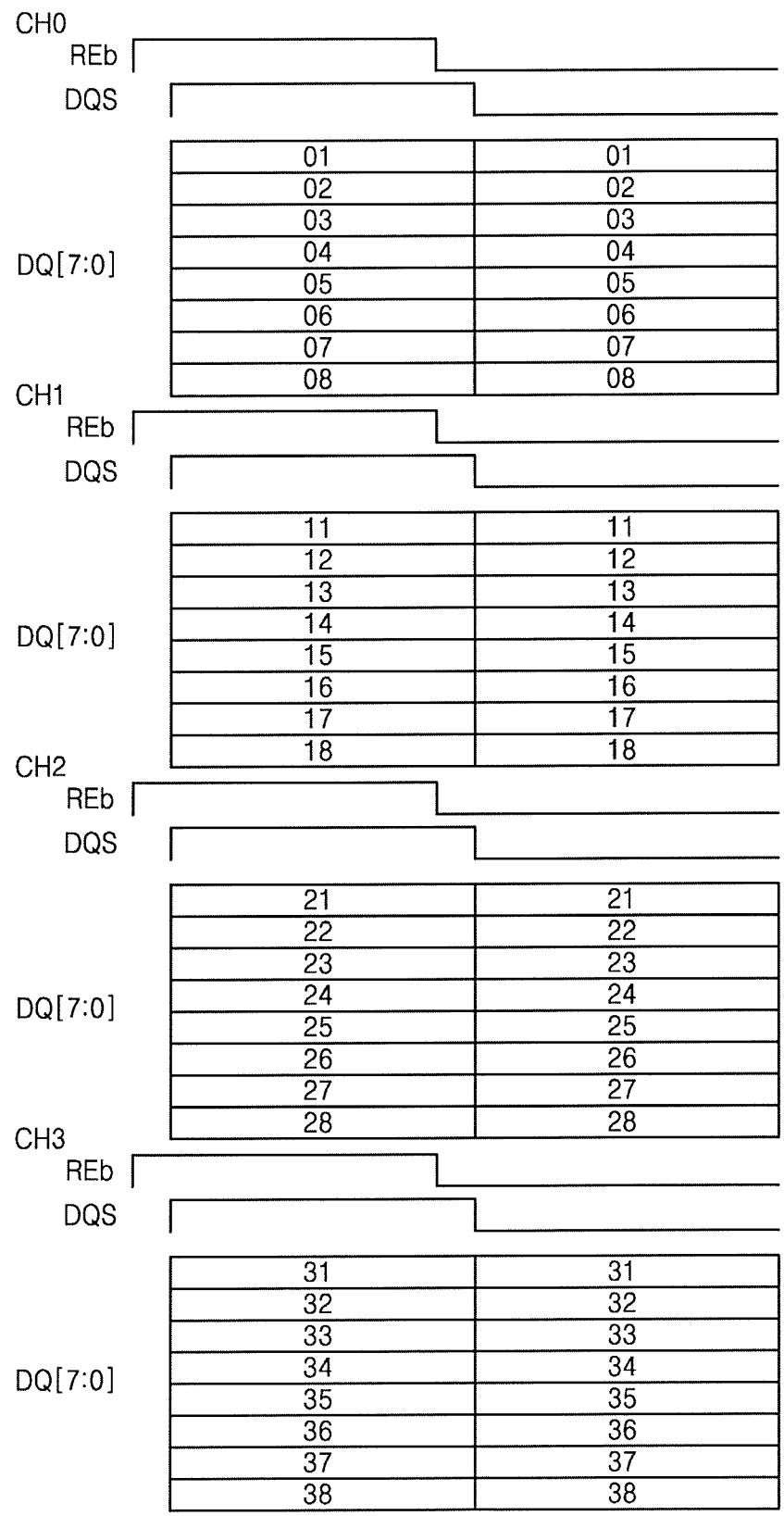
FIG. 28 is a timing diagram relating to signals for data transmission according to a read operation between an interfacing device and a memory device in memory systems according to an exemplary embodiment of the inventive concept.

FIG. 28 is a timing diagram relating to signals for data transmission according to a read operation between the interfacing device 300 and the memory device 200 in the memory systems 1000 and 2000 of FIGS. 1 and 2 according to an exemplary embodiment of the inventive concept.

The interfacing device 300 used for data transmission according to the read operation receives the signal CH_VAL_O with respect to channel information, and the read enable signal REb from the memory controller 100.

As shown in FIGS. 27 and 28, the interfacing device 300 generates the read enable signal REb with respect to each of the virtual channels based on the read enable signal REb corresponding to the virtual channel selected by CH_VAL_O.

The data DQ[7:0] read from NVM chips 210 that are connected in configurations selected in the virtual channels with respect to each of the virtual channels based on a configuration selection and transmission of command information, address information, and the read enable signal REb with respect to each of the virtual channels described above and the data strobe signal DQS are input to the interfacing device 300.

The interfacing device 300 performs TDM on the signal CH_VAL_I indicating a virtual channel number by which data is transmitted and on the flash read data strobe signal DQS_r, and outputs the signal CH_VAL_I and the flash read data strobe signal DQS_r via a single physical channel to the memory controller 100.

The interfacing device 300 receives the parallel data DW[7:0] via the virtual channel CH0, outputs DQ_CH[1] by converting the parallel data DQ[7:4] into serial data 15~18, and outputs DQ_CH[2] by converting the parallel data DQ[3:0] into serial data 21~24.

The interfacing device 300 receives the parallel data DW[7:0] via the virtual channel CH3, outputs DQ_CH[7] by converting the parallel data DQ[7:4] into serial data 35~38, and outputs DQ_CH[6] by converting the parallel data DQ[3:0] into serial data 31~34.

Figure 29:
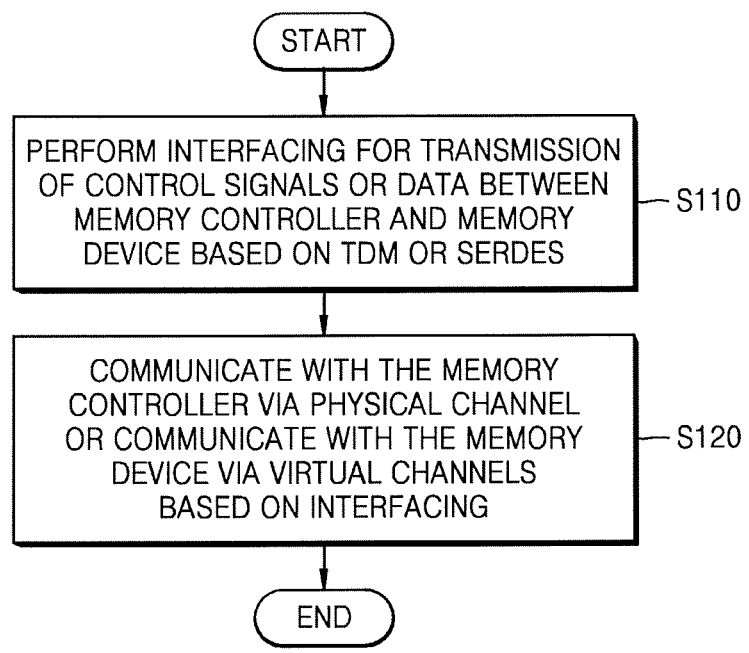
FIG. 29 is a flowchart showing an interfacing method performed by memory systems according to an exemplary embodiment of the inventive concept.

FIG. 29 is a flowchart showing an interfacing method performed by the memory systems 1000 and 2000 of FIGS. 1 and 2 according to an exemplary embodiment of the inventive concept.

The interfacing device 300 performs interfacing for transmission of control signals or data between the memory controller 100 and the memory device 200 at operation S110. For example, the interfacing device 300 performs interfacing to transmit the control signals based on a TDM communication process and performs interfacing to transmit the data based on a SERDES communication process. The control signals are signals used for performing an erase operation, a read operation, or a write operation in the memory systems 1000 and 2000.

For example, the interfacing device 300 generates the control signals with respect to each of the virtual channels 600 corresponding to the physical channel 500 based on TDM from the control signals received via the physical channel 500, and outputs the generated control signals for the virtual channels 600 to the memory device 200.

The control signals may include, for example, signals relating to channel information, signals relating to chip enable information, and signals relating to chip enable timing information. In this regard, the channel information is information designating a plurality of virtual channels. The control signals received from the memory controller 100 via a physical channel based on TDM may include the control signals with respect to each of the virtual channels corresponding to the physical channel in a frame unit.

The interfacing device 300 communicates with the memory controller 100 via the physical channel 500 or communicates with the memory device 200 via the virtual channels 600 at operation S120. For example, the interfacing device 300 may convert serial data received from the memory controller 100 into parallel data and output the parallel data to data I/O ports of the virtual channels, and may convert parallel data received from the memory device 200 via each of the virtual channels into serial data and output the serial data via a data I/O port of the physical channel allocated to the virtual channels.

Figure 30:
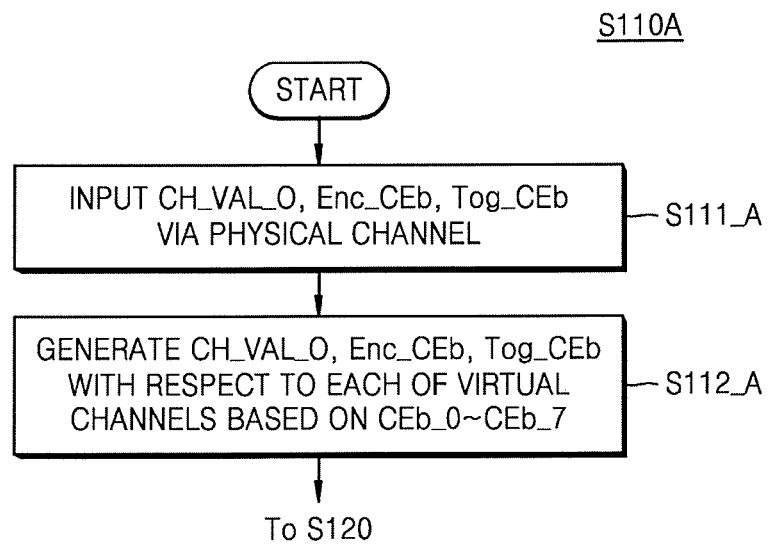
FIG. 30 is a flowchart of a signal processing process of selecting a configuration in an interfacing operation of FIG. 29 according to an exemplary embodiment of the inventive concept.

FIG. 30 is a flowchart of a signal processing process S110A of selecting a configuration in an interfacing operation of FIG. 29, according to an exemplary embodiment of the inventive concept.

The signal CH_VAL_O, the signal Enc_CEb, and the toggle signal Tog_CEb are input via the physical channel at operation S111_A. The signal CH_VAL_O, the signal Enc_CEb, and the toggle signal Tog_CEb are generated with respect to each virtual channel 600 based on Ceb_0~Ceb_7 at operation S112_A.

Figure 31:
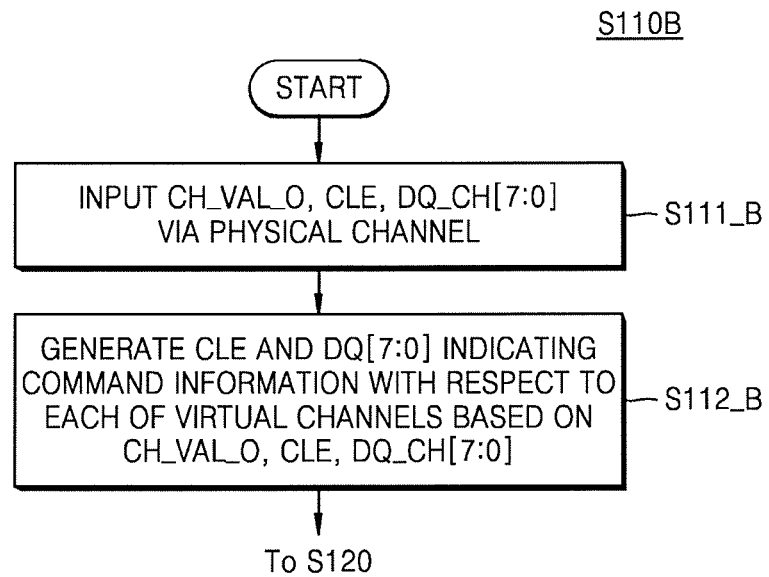
FIG. 31 is a flowchart showing a signal processing process of transmitting command information in an interfacing operation of FIG. 29 according to an exemplary embodiment of the inventive concept.

FIG. 31 is a flowchart showing a signal processing process S110B of transmitting command information in an interfacing operation of FIG. 29, according to an exemplary embodiment of the inventive concept.

The interfacing device 300 receives the signal CH_VAL_O with respect to channel information, the command latch enable signal CLE with respect to each of virtual channels, and DQ_CH[0]~DQ_CH[7] including command information regarding the virtual channels from the memory controller 100 at operation S111-B. For example, CH_VAL_O, CLE, and DQ_CH[0]~DQ_CH[7] may be input to the interfacing device 300 according to the timing of FIG. 21.

The interfacing device 300 generates a command latch enable signal and command information with respect to each of the virtual channels based on CH_VAL_O, CLE, and DQ_CH[0]~DQ_CH[7] at operation S112-B. The generated command latch enable signal and the command information are output to the memory device 200. For example, the command latch enable signal CLE and DQ[7:0] indicating the command information with respect to each of the virtual channels may be output to the memory device 200 according to the timing of FIG. 22.

Figure 32:
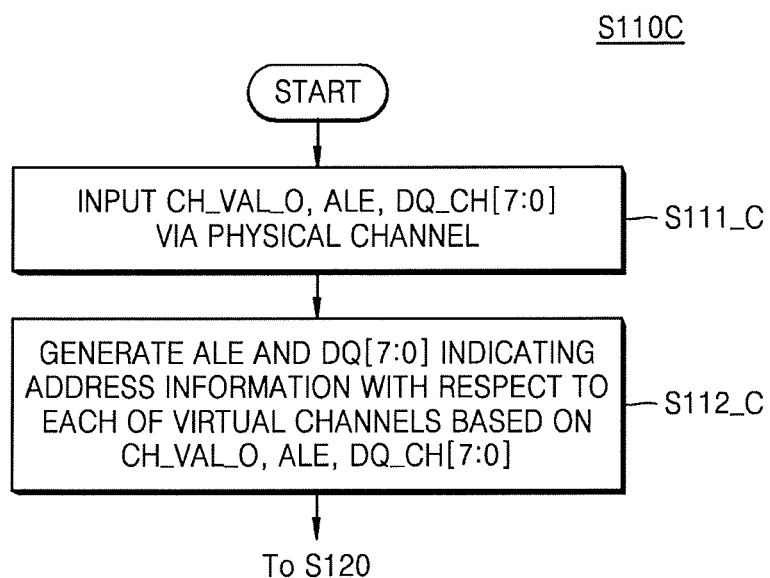
FIG. 32 is a flowchart showing a signal processing process of transmitting address information in an interfacing operation of FIG. 29 according to an exemplary embodiment of the inventive concept.

FIG. 32 is a flowchart showing a signal processing process S110C of transmitting address information in an interfacing operation of FIG. 29, according to an exemplary embodiment of the inventive concept.

The interfacing device 300 receives the signal CH_VAL_O with respect to channel information, the address latch enable signal ALE with respect to each of virtual channels, and DQ_CH[0]~DQ_CH[7] including address information with respect to each of the virtual channels from the memory controller 100 at operation S111-C. For example, CH_VAL_O, ALE, and DQ_CH[0]~DQ_CH[7] may be input to the interfacing device 300 according to the timing of FIG. 23.

The interfacing device 300 generates an address latch enable signal and address information with respect to each of the virtual channels based on CH_VAL_O, ALE, and DQ_CH[0]~DQ_CH[7] at operation S112-C. The generated address latch enable signal and the address information are output to the memory device 200. For example, the address latch enable signal ALE and DQ[7:0] indicating the address information with respect to each of the virtual channels may be output to the memory device 200 according to the timing of FIG. 24.

Figure 33:
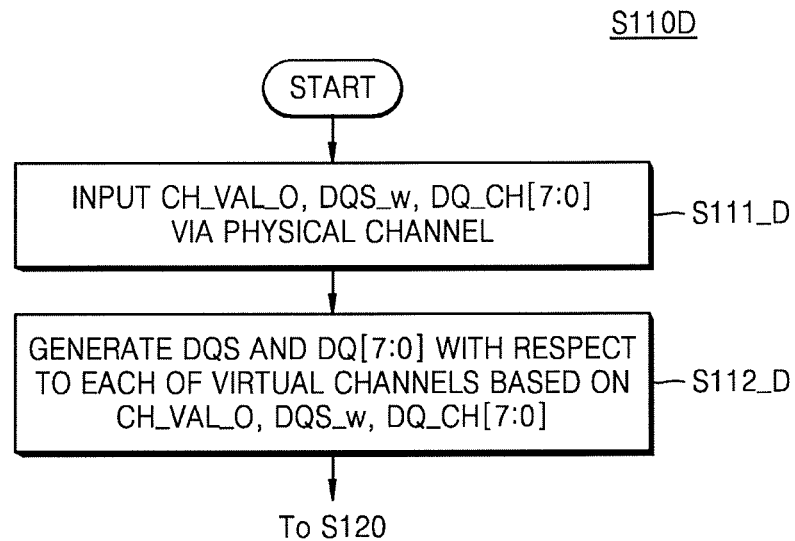
FIG. 33 is a flowchart showing a signal processing process for data transmission according to a write operation in an interfacing operation of FIG. 29 according to an exemplary embodiment of the inventive concept.

FIG. 33 is a flowchart showing a signal processing process S110D for data transmission according to a write operation in an interfacing operation of FIG. 29, according to an exemplary embodiment of the inventive concept.

The interfacing device 300 receives the signal CH_VAL_O with respect to channel information, the flash write data strobe signal DQS_w, and DQ_CH[0]~DQ_CH

[7] including write data with respect to virtual channels from the memory controller 100 at operation S111-D. For example, CH_VAL_O, DQS_w, and DQ_CH[0]~DQ_CH[7] may be input to the interfacing device 300 according to the timing of FIG. 25.

The interfacing device 300 generates a data strobe signal and data with respect to each of the virtual channels based on CH_VAL_O, DQS_w, and DQ_CH[0]~DQ_CH[7] at operation S112-D. The generated data strobe signal and the data are output to the memory device 200. For example, the data strobe signal DQS and the data DQ[7:0] with respect to each of the virtual channels may be output to the memory device 200 according to the timing of FIG. 26.

Figure 34:
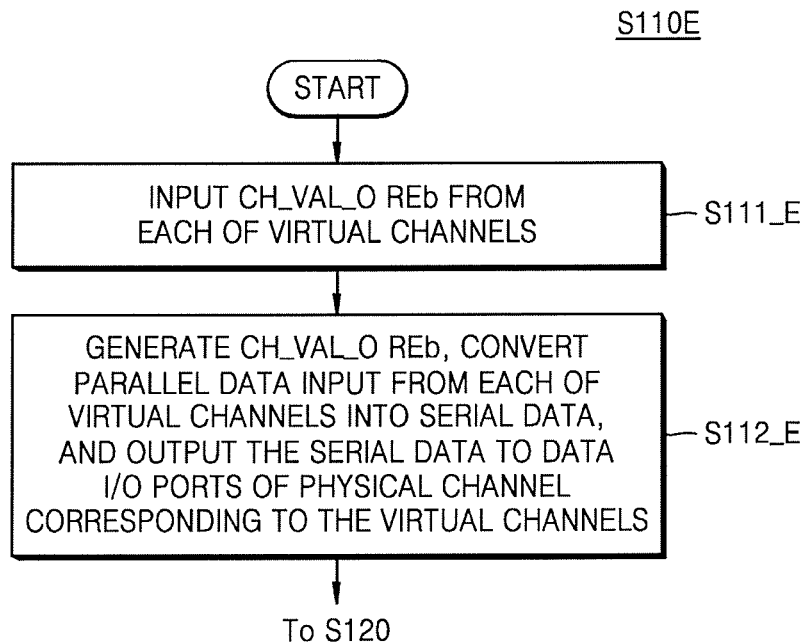
FIG. 34 is a flowchart showing a signal processing process for a control signal transmission according to a read operation in an interfacing operation of FIG. 29 according to an exemplary embodiment of the inventive concept.

FIG. 34 is a flowchart showing a signal processing process S110E for a control signal transmission according to a read operation in an interfacing operation of FIG. 29, according to an exemplary embodiment of the inventive concept.

The interfacing device 300 receives the signal CH_VAL_O with respect to channel information and the read enable signal REb from the memory controller 100 at operation S111-E. For example, CH_VAL_O and REb may be input to the interfacing device 300 according to the timing of FIG. 27.

The interfacing device 300 generates a read enable signal with respect to each of virtual channels based on CH_VAL_O and REb at operation S112-E. The generated read enable signal with respect to each of the virtual channels is output to the memory device 200. For example, the read enable signal REb with respect to each of the virtual channels may be output to the memory device 200 according to the timing of FIG. 28.

Figure 35:
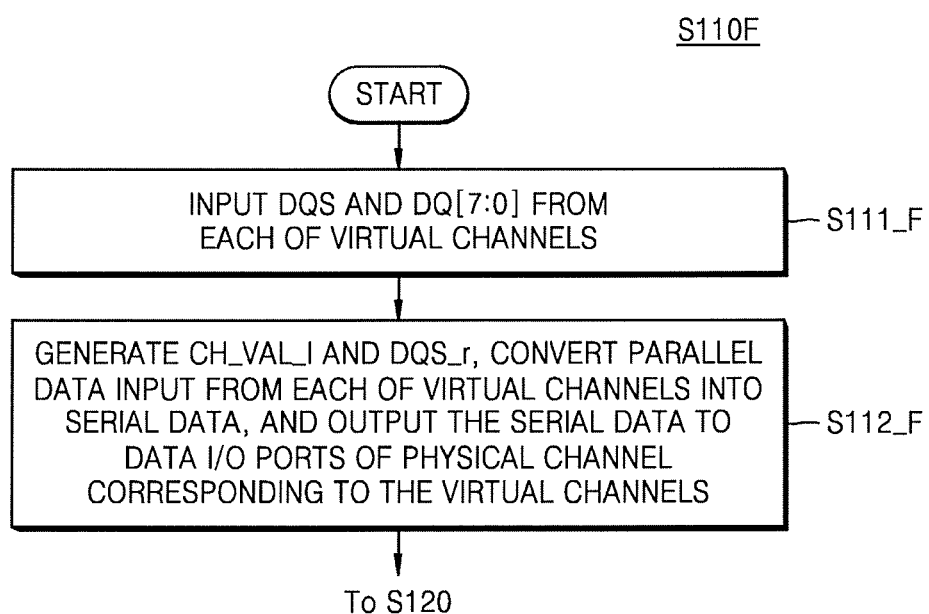
FIG. 35 is a flowchart showing a signal processing process for data transmission according to a read operation in an interfacing operation of FIG. 29 according to an exemplary embodiment of the inventive concept.

FIG. 35 is a flowchart showing a signal processing process S110F for data transmission according to a read operation in an interfacing operation of FIG. 29, according to an exemplary embodiment of the inventive concept.

The interfacing device 300 receives the data DQ[7:0] read from the NVM chips 210 that are connected in configurations selected in the virtual channels with respect to each of the virtual channels based on a configuration selection and transmission of command information, address information, and the read enable signal REb with respect to each of the virtual channels and the data strobe signal DQS from the memory device 200 at operation S111-F. For example, the data strobe signal DQS and the data DQ[7:0] may be input to the interfacing device 300 according to the timing of FIG. 28.

The interfacing device 300 generates the signal CH_VAL_I indicating a virtual channel number by which data is transmitted and the flash read data strobe signal DQS_r based on TDM, converts parallel data input from each of the virtual channels into serial data, and outputs the serial data to a data I/O port of a physical channel corresponding to the virtual channels at operation S112-F. For example, the data DQ[7:0] with respect to each of the virtual channels may be converted into the data DQ_CH[7:0] and output to the memory controller 100 according to the timing of FIGS. 27 and 28.

Figure 36:
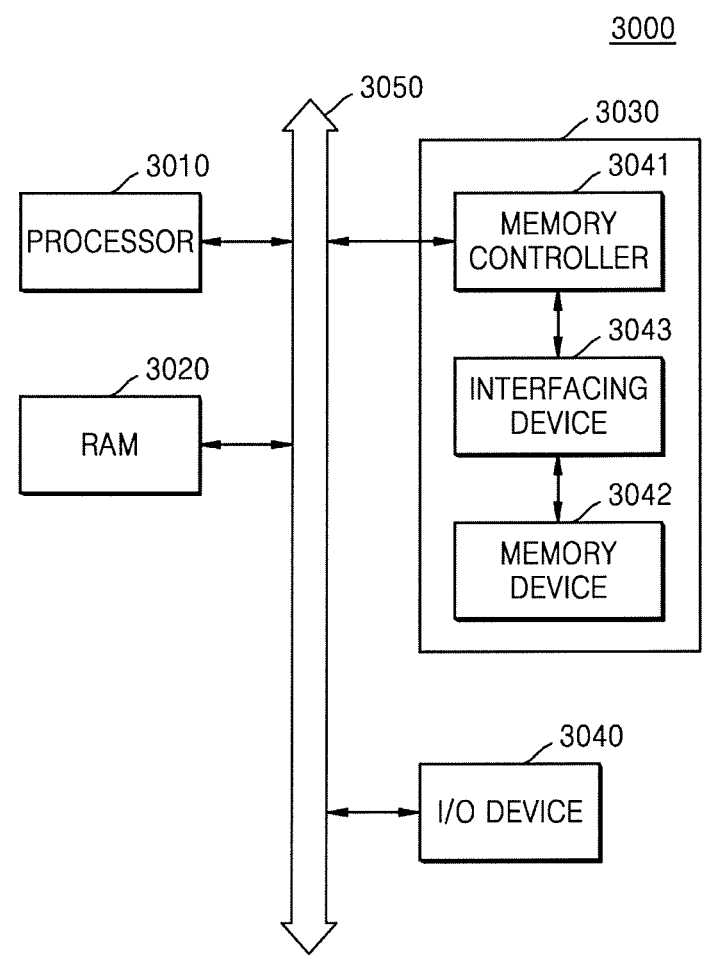
FIG. 36 is a diagram of a computing system to which a memory system according to an exemplary embodiment of the inventive concept is applied according to an exemplary embodiment of the inventive concept.

FIG. 36 is a diagram of a computing system 3000 to which a memory system according to an exemplary embodiment of the inventive concept is applied, according to an exemplary embodiment of the inventive concept.

As shown in FIG. 36, the computing system 3000 may include a processor 3010, RAM 3020, a storage device 3030, an I/O device 3040, and a bus 3050.

The computing system 3000 may include ports that may be used to communicate with, for example, a video card, a sound card, a memory card, a USB device, etc., or other electronic devices. The computing system 3000 may be implemented as, for example, a personal computer, or may be implemented as an electronic device such as, for example, a notebook computer, a cell phone, a personal digital assistant (PDA), a camera, etc.

The bus 3050 is a transmission path through which data, addresses, and control signals are transmitted between elements of the computing system 3000.

The processor 3010 may perform specific arithmetic operations or tasks. For example, the processor 3010 may be a micro-processor, a CPU, etc. The processor 3010 may communicate with the RAM 3020, the storage device 3030, and the I/O device 3040 via the bus 3050, which may be, for example, an address bus, a control bus, a data bus, etc. According to exemplary embodiments, the processor 3010 may be connected to an extension bus such as a peripheral component interconnect (PCI) bus.

Data used for performing a process generated by the processor 3010 is loaded to the RAM 3020. The RAM 3020 may function as a main memory and may be implemented as, for example, dynamic random access memory (DRAM) or static random access memory (SRAM).

The storage device 3030 includes a memory controller 3041, a memory device 3042, and an interfacing device 3043. The memory controller 3041, the memory device 3042, and the interfacing device 3043 included in the storage device 3030 may be respectively implemented as the memory controller 100, the memory device 200, and the interfacing device 300 of FIGS. 1 and 2.

The I/O device 3040 may include an input means such as, for example, a keyboard, a keypad, a mouse, etc., and an output means such as, for example, a printer, a display device, etc.

The processor 3010 may perform arithmetic operations or data processing corresponding to a user command input via the I/O device 3040. The processor 3010 may transmit a request for performing an operation of reading data from the storage device 3030 or an operation of writing data to the storage device 3030 so as to perform arithmetic operations or data processing corresponding to the user command.

The storage device 3030 may perform a read operation or a write operation according to the request transmitted from the processor 3010.

Figure 37:
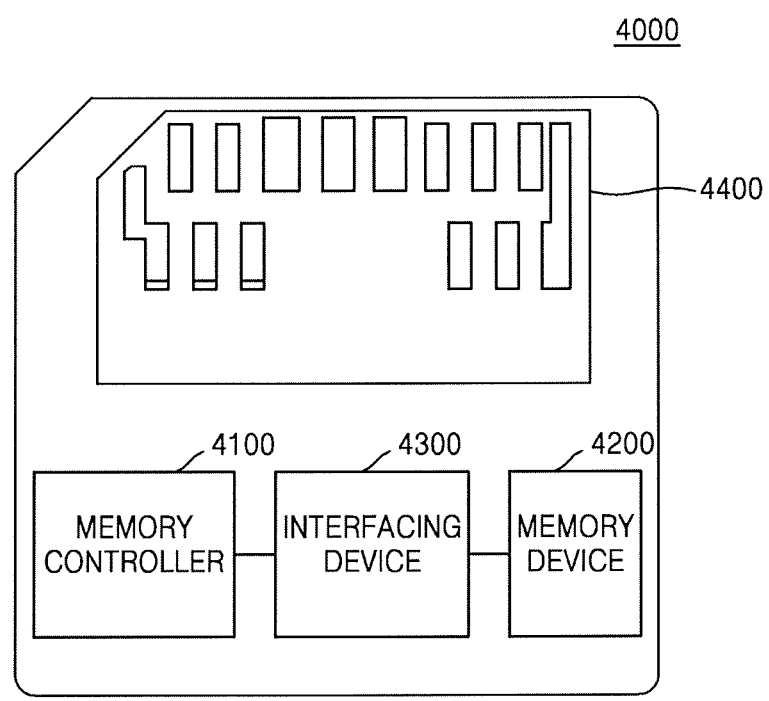
FIG. 37 is a diagram of a memory card to which a memory system according to an exemplary embodiment of the inventive concept is applied according to an exemplary embodiment of the inventive concept.

FIG. 37 is a diagram of a memory card 4000 to which a memory system according to an exemplary embodiment of the inventive concept is applied, according to an exemplary embodiment of the inventive concept.

The memory card 4000 may be a portable storage device that may be used by being connected to an electronic device such as, for example, a mobile device or a desktop computer. As shown in FIG. 37, the memory card 4000 may include, for example, a memory controller 4100, a memory device 4200, an interfacing device 4300, and a port area 4400. The memory card 4000 may communicate with an external host through the port area 4400, and the memory controller 4100 and the memory device 4200 may exchange control signals or data via the interfacing device 4300. The memory controller 4100, the memory device 4200, and the interfacing device 4300 may respectively be the memory controller 100, the memory device 200, and the interfacing device 300 of FIGS. 1 and 2.

The memory system applied to exemplary embodiments of the inventive concept described above may be mounted using various types of packages. For example, the memory system of the inventive concept may be mounted using packages such as, for example, a Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic MetricQuad Flat Pack (MQFP), Thin Quad Flatpack (TQFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), or Wafer-Level Processed Stack Package (WSP).

While the present inventive concept has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A method of interfacing a memory controller and a memory device in a memory system, comprising:
    transmitting a control signal between the memory controller and the memory device via a time division multiplexing (TDM) interface using a TDM communication process; and
    transmitting data comprising a plurality of bits between the memory controller and the memory device via a serializer/deserializer (SERDES) interface using a SERDES communication process,
    wherein the control signal transmitted via the TDM interface using the TDM communication process is transmitted in parallel with the data transmitted via the SERDES interface using the SERDES communication process,
    wherein data communication in the memory system is performed via a physical channel and a plurality of virtual channels corresponding to the physical channel,
    wherein the control signal indicates which of the plurality of virtual channels which bits included in the data are to be transmitted on.

2. The method of claim 1, further comprising:
    converting serial data received from the memory controller into parallel data; and
    outputting the parallel data to data input/output (I/O) ports corresponding to the plurality of virtual channels.

3. The method of claim 1, further comprising:
    converting parallel data received from the memory device into serial data; and
    outputting the parallel data to a data input/output (I/O) port corresponding to the physical channel.

4. The method of claim 1, further comprising:
    generating a plurality of control signals including the control signal,
    wherein each of the control signals corresponds to a virtual channel from among the plurality of virtual channels.

5. The method of claim 1, wherein the control signal is one of a plurality of control signals, and the method further comprises:
    generating a plurality of chip enable signals based on a first control signal from among the plurality of control signals relating to channel information, a second control signal from among the plurality of control signals relating to chip enable information, and a third control signal from among the plurality of control signals relating to chip enable timing information,
    wherein the plurality of chip enable signals corresponds to the plurality of virtual channels, and the first to third control signals are communicated from the memory controller via the physical channel.

6. The method of claim 1, wherein the control signal is one of a plurality of control signals, and the method further comprises:
    generating a plurality of command latch enable signals and command information based on a control signal from among the plurality of control signals relating to channel information, and control signals from among the plurality of control signals relating to data input/output (I/O) ports into which the command information is input,
    wherein the plurality of command latch enable signals corresponds to the plurality of virtual channels, and the plurality of command latch enable signals and the command information are communicated from the memory controller via the physical channel.

7. The method of claim 1, wherein the control signal is one of a plurality of control signals, and the method further comprises:
    generating a plurality of address latch enable signals and address information based on a control signal from among the plurality of control signals relating to channel information, and control signals from among the plurality of control signals relating to data input/output (I/O) ports into which the address information is input,
    wherein the plurality of address latch enable signals corresponds to the plurality of virtual channels, and the plurality of address latch enable signals and the address information are communicated from the memory controller via the physical channel.

8. The method of claim 1, wherein the control signal is one of a plurality of control signals, and the method further comprises:
    generating a plurality of data strobe signals corresponding to the plurality of virtual channels based on a control signal from among the plurality of control signals relating to channel information, a write data strobe signal, and control signals from among the plurality of control signals relating to data input/output (I/O) ports,
    wherein the plurality of data strobe signals is communicated from the memory controller via the physical channel.

9. The method of claim 1, further comprising:
    receiving data read from the memory device as parallel data via a plurality of data input/output (I/O) ports corresponding to the plurality of virtual channels based on the control signal and a read enable signal,
    wherein the data and the read enable signal are input from the memory controller via the physical channel, and the control signal relates to channel information;
    converting the parallel data received via the plurality of I/O ports into serial data; and
    outputting the serial data to a data I/O port of the physical channel.

10. A memory interfacing device, comprising:
    a time division multiplexing (TDM) interface configured to transmit and receive a plurality of control signals between a memory controller and a memory device using a TDM communication process; and
    a serializer/deserializer (SERDES) interface configured to convert first parallel data input from the memory device into first serial data comprising a first plurality of bits and output the first serial data to the memory controller, or convert second serial data input from the memory controller into second parallel data comprising a second plurality of bits and output the second parallel data to the memory device, using a SERDES communication process, based on the plurality of control signals communicated using the TDM communication process, wherein the control signals transmitted via the TDM interface using the TDM communication process are transmitted in parallel with the first serial data or the second parallel data output via the SERDES interface using the SERDES communication process, wherein data communication between the memory controller and the memory device is performed via a physical channel and a plurality of virtual channels corresponding to the physical channel, wherein the control signals indicate which of the plurality of virtual channels which bits included in the first plurality of bits or which bits included in the second plurality of bits are to be transmitted on.

11. The memory interfacing device of claim 10, wherein the TDM interface is configured to output a control signal from among the plurality of control signals to each of a plurality of virtual channels.

12. The memory interfacing device of claim 10, wherein the SERDES interface is configured to split N data input/output (I/O) ports provided in a single physical channel connected to the memory controller into M data I/O ports, and assign the M data I/O ports to data I/O ports of the virtual channels, wherein N is an integer greater than or equal to 2, M≤N, and M virtual channels are connected to the memory device.

13. The memory interfacing device of claim 12, wherein the SERDES interface is configured to convert third serial data output from each of two or more data I/O ports of the physical channel into third parallel data, and output the third parallel data to data I/O ports assigned to the plurality of virtual channels in response to a number of the data I/O ports assigned to the plurality of virtual channels being at least two.

14. The memory interfacing device of claim 12, wherein the SERDES interface is configured to split third parallel data received from data I/O ports of the memory device into two or more pieces of third parallel data, convert each piece of the split third parallel data into third serial data, and output the third serial data to data I/O ports assigned to the plurality of virtual channels.

15. The memory interfacing device of claim 10, wherein the memory controller and the TDM interface are configured to transmit and receive the plurality of control signals via a third signal port through which chip enable timing information is communicated, a read data strobe signal port, a write data strobe signal port, a command latch enable signal port, an address enable signal port, a write enable signal port, and a read enable signal port.

16. The memory interfacing device of claim 10, wherein the TDM interface and the memory device are configured to transmit and receive the plurality of control signals via a chip enable signal port, a command latch enable signal port, an address enable signal port, a write enable signal port, a read enable signal port, and a data strobe signal port.

17. A memory system, comprising:
a memory controller configured to input and output a plurality of control signals and data, wherein the data comprises a plurality of bits;
a memory device configured to perform a data read operation and a data write operation based on the control signals; and
an interfacing device configured to communicate with the memory controller via a physical channel, and communicate with the memory device via a plurality of virtual channels corresponding to the physical channel,
wherein the interfacing device comprises a time division multiplexing (TDM) interface and a serializer/deserializer (SERDES) interface,
wherein the interfacing device is configured to transmit the plurality of control signals via the TDM interface using a TDM communication process, and transmit the data via the SERDES interface using a SERDES communication process,
wherein the control signals transmitted via the TDM interface using the TDM communication process are transmitted in parallel with the data transmitted via the SERDES interface using the SERDES communication process,
wherein the control signals indicate which of the plurality of virtual channels which bits included in the data are to be transmitted on.

18. The memory system of claim 17, wherein the interfacing device is configured to perform TDM on the plurality of control signals input via the physical channel connected to the memory controller, and output the plurality of control signals with respect to each of the plurality of virtual channels.

19. The memory system of claim 17, wherein the interfacing device is configured to convert first serial data output from the memory controller into first parallel data and transmit the first parallel data to the memory device, and convert second parallel data output from the memory device into second serial data and transmit the second serial data to the memory controller.

20. The memory system of claim 17, further comprising:
a frequency boosting interfacing device connected between the interfacing device and the memory device via the plurality of virtual channels,
wherein the frequency boosting interfacing device comprises a multiplexer configured to electrically separate input/output (I/O) ports of the memory device in each of the plurality of virtual channels.

* * * * *